United States Patent
Matsubara et al.

(10) Patent No.: US 8,843,511 B2
(45) Date of Patent: Sep. 23, 2014

(54) CONFIGURATION MANAGEMENT SYSTEM, PROXY SYSTEM, AND CONFIGURATION MANAGEMENT METHOD

(75) Inventors: Masazumi Matsubara, Kawasaki (JP); Yasuhide Matsumoto, Kawasaki (JP); Yukihiro Watanabe, Kawasaki (JP); Kuniaki Shimada, Kawasaki (JP); Yuji Wada, Kawasaki (JP); Kenji Morimoto, Bunkyo-ku (JP); Hiroshi Otsuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/067,736

(22) Filed: Jun. 22, 2011

(65) Prior Publication Data
US 2011/0314050 A1 Dec. 22, 2011

Related U.S. Application Data

(63) Continuation of application No. PCT/JP2008/073390, filed on Dec. 24, 2008.

(51) Int. Cl.
*G06F 17/30* (2006.01)

(52) U.S. Cl.
CPC .................. *G06F 17/30566* (2013.01)
USPC ........................................................ 707/769

(58) Field of Classification Search
CPC ................................................ G06F 17/30566
See application file for complete search history.

(56) References Cited

U.S. PATENT DOCUMENTS

| | | | | |
|---|---|---|---|---|
| 5,987,575 | A * | 11/1999 | Yamaguchi | 711/162 |
| 7,171,681 | B1 * | 1/2007 | Duncan et al. | 726/11 |
| 2002/0069241 | A1 * | 6/2002 | Narlikar et al. | 709/203 |
| 2007/0294237 | A1 * | 12/2007 | John et al. | 707/4 |

FOREIGN PATENT DOCUMENTS

| | | |
|---|---|---|
| JP | 2001-051890 | 2/2001 |
| JP | 2004-302918 | 10/2004 |

OTHER PUBLICATIONS

Clark et al. The Federated CMDB Vision: A Joint White Paper from BMC, CA, Fujitsu, HP, IBM, and Microsoft, Veriosn 1.0, Jan. 25, 2007, pp. 1-10.*
International Search Report for PCT/JP2008/073390, Mailed Feb. 10, 2009.
Dale Clark et al., The Federated CMDB Vision: A Joint White Paper from BMC, CA, Fujitsu, HP, IBM, and Microsoft. Version 1.0, Jan. 25, 2007 (pp. 1-10).
ITIL Base no Kosei Kanri o Shien suru Togo CMDB Gijutsu Kizon DB o Kasoteki ni Togo shite System o Mieru Ka, [online], Oct. 1, 2008, [retrieval date Jan. 29, 2009], Internet <http://jp.fujitsu.com/about/journal/technology/20081001/> (7pp).

* cited by examiner

*Primary Examiner* — Dinku Gebresenbet
(74) *Attorney, Agent, or Firm* — Staas & Halsey LLP

(57) ABSTRACT

A configuration management system includes a plurality of MDRs that stores information about resources as configuration items, a FCMDB, a plurality of proxy apparatuses, and a proxy management apparatus, wherein the proxy management apparatus receives configuration items from the MDRs, reconciles the receives configuration items, selects a destination proxy apparatus such that the numbers of configuration items stored in the proxy apparatuses are substantially equal to each other, and sends the reconciled configuration items to the selected proxy apparatus, wherein the proxy apparatuses store configuration items sent from the proxy management apparatus, and wherein the FCMDB receives a query from a client, selects among the plurality of proxy apparatuses a proxy apparatus that stores a configuration item that is to serve as a query result, and receives the configuration item from the selected proxy apparatus.

12 Claims, 22 Drawing Sheets

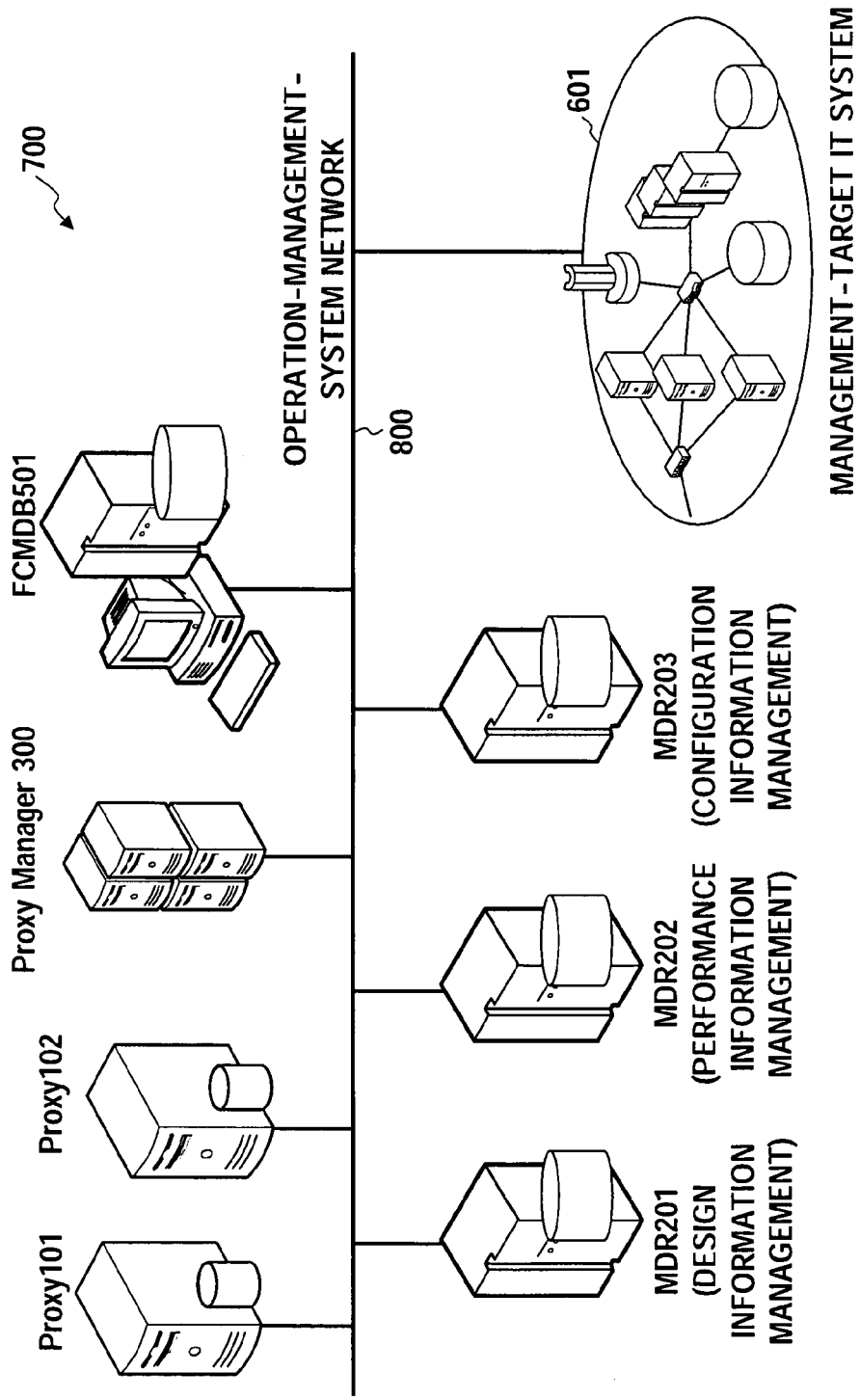

FIG.4

(A) MDR201 (DESIGN INFORMATION) DATA MANAGEMENT UNIT

| CI TYPE (LOCAL ID) | PROPERTY | VALUE |
| --- | --- | --- |
| SERVER (sv1) | IP ADDRESS | 192.168.0.1 |
| | NAME | WEB SERVER1 |
| | MODEL NUMBER | XYZ |
| SERVER (sv2) | IP ADDRESS | 192.168.0.3 |
| | NAME | WEB SERVER2 |
| | MODEL NUMBER | XYZ |
| SERVER (sv3) | IP ADDRESS | 192.168.0.5 |
| | NAME | APPLICATION SERVER |
| | MODEL NUMBER | ABCD |
| SERVER (sv4) | IP ADDRESS | 192.168.0.4 |
| | NAME | WEBSERVER3 |
| | MODEL NUMBER | ABCD |

(B) MDR202 (PERFORMANCE INFORMATION) DATA MANAGEMENT UNIT

| CI TYPE (LOCAL ID) | PROPERTY | VALUE |
| --- | --- | --- |
| SERVER (mdr2_id1) | IP ADDRESS | 192.168.0.1 |
| | LOAD AVERAGE | 3.2 |
| | AVERAGE CPU UTILIZATION | 60% |
| SERVER (mdr2_id2) | IP ADDRESS | 192.168.0.3 |
| | LOAD AVERAGE | 5.1 |
| | AVERAGE CPU UTILIZATION | 55% |
| SERVER (mdr2_id3) | IP ADDRESS | 192.168.0.5 |
| | LOAD AVERAGE | 3.0 |
| | AVERAGE CPU UTILIZATION | 63% |

FIG.5
MDR203 (CONFIGURATION INFORMATION) DATA MANAGEMENT UNIT

| CI TYPE (LOCAL ID) | PROPERTY | VALUE |
|---|---|---|
| SERVER (SERVER1) | IP ADDRESS | 192.168.0.1 |
| | NAME | WEB SERVER1 |
| | CPU CLOCK FREQUENCY | 1.5GHz |
| | DISK VOLUME | 150GB |
| | STATUS | NORMAL |
| SERVER (SERVER2) | IP ADDRESS | 192.168.0.3 |
| | NAME | WEB SERVER2 |
| | CPU CLOCK FREQUENCY | 2.4GHz |
| | DISK VOLUME | 200GB |
| | STATUS | NORMAL |
| SERVER (SERVER3) | IP ADDRESS | 192.168.0.4 |
| | NAME | WEB SERVER3 |
| | CPU CLOCK FREQUENCY | 1.5GHz |
| | DISK VOLUME | 150GB |
| | STATUS | NORMAL |
| SERVER (SERVER4) | IP ADDRESS | 192.168.0.5 |
| | NAME | APPLICATION SERVER |
| | CPU CLOCK FREQUENCY | 3.0GHz |
| | DISK VOLUME | 500GB |
| | STATUS | NORMAL |
| SWITCH (SWITCH1) | IP ADDRESS | 192.168.0.250 |
| | NAME | SWITCH A |
| | MODEL NUMBER | SWZD1 |
| | PORT QUANTITY | 20 |
| | STATUS | NORMAL |
| SWITCH (SWITCH2) | IP ADDRESS | 192.168.0.251 |
| | NAME | SWITCH B |
| | MODEL NUMBER | SWZD2 |
| | PORT QUANTITY | 40 |
| | STATUS | NORMAL |
| STORAGE (STORAGE1) | IP ADDRESS | 192.168.0.10 |
| | NAME | NAS_1 |
| | DISK VOLUME | 4TB |
| | DISK UTILIZATION | 1.3TB |
| | STATUS | NORMAL |

(A) Proxy Manager DATA ALLOCATION INFORMATION MANAGEMENT UNIT

| CI TYPE | ALLOCATED PROXY | COMMON PROPERTY | VALUE |
|---|---|---|---|
| SERVER | Proxy101 | IP ADDRESS | 192.168.0.1 |
| SERVER | Proxy101 | IP ADDRESS | 192.168.0.3 |
| SERVER | Proxy102 | IP ADDRESS | 192.168.0.4 |
| SERVER | Proxy101 | IP ADDRESS | 192.168.0.5 |
| SWITCH | Proxy102 | IP ADDRESS | 192.168.0.250 |
| SWITCH | Proxy102 | IP ADDRESS | 192.168.0.251 |
| STORAGE | Proxy102 | IP ADDRESS | 192.168.0.10 |

(B) FCMDB DATA MANAGEMENT UNIT

| CI TYPE (GLOBAL ID) | COMMON PROPERTY | VALUE |
|---|---|---|
| SERVER (gid0001) | IP ADDRESS | 192.168.0.1 |
| SERVER (gid0002) | IP ADDRESS | 192.168.0.3 |
| SERVER (gid0003) | IP ADDRESS | 192.168.0.4 |
| SERVER (gid0004) | IP ADDRESS | 192.168.0.5 |
| SWITCH (gid0005) | IP ADDRESS | 192.168.0.250 |
| SWITCH (gid0006) | IP ADDRESS | 192.168.0.251 |
| STORAGE (gid0007) | IP ADDRESS | 192.168.0.10 |

(C) FCMDB DATA MAPPING INFORMATION MANAGEMENT UNIT

| CI TYPE (GLOBAL ID) | CORRESPONDENCE MDR (Proxy) LOCAL ID |
|---|---|
| gid0001 | Proxy101:lid0001 |
| gid0002 | Proxy101:lid0002 |
| gid0003 | Proxy102:svr1 |
| gid0004 | Proxy101:lid0003 |
| gid0005 | Proxy102:sw1 |
| gid0006 | Proxy102:sw2 |
| gid0007 | Proxy102:sto1 |

(A) Proxy101:DATA MANAGEMENT UNIT

| CI TYPE (LOCAL ID) | PROPERTY | VALUE |
|---|---|---|
| SERVER (Iid0001) | IP ADDRESS | 192.168.0.1 |
| | NAME | WEB SERVER1 |
| | CPU CLOCK FREQUENCY | 1.5GHz |
| | DISK VOLUME | 150GB |
| | MODEL NUMBER | XYZ |
| | LOAD AVERAGE | 3.2 |
| | AVERAGE CPU UTILIZATION | 60% |
| | STATUS | NORMAL |
| SERVER (Iid0002) | IP ADDRESS | 192.168.0.3 |
| | NAME | WEB SERVER2 |
| | CPU CLOCK FREQUENCY | 2.4GHz |
| | DISK VOLUME | 200GB |
| | MODEL NUMBER | XYZ |
| | LOAD AVERAGE | 5.1 |
| | AVERAGE CPU UTILIZATION | 55% |
| | STATUS | NORMAL |
| SERVER (Iid0003) | IP ADDRESS | 192.168.0.5 |
| | NAME | APPLICATION SERVER |
| | CPU CLOCK FREQUENCY | 3.0GHz |
| | DISK VOLUME | 500GB |
| | MODEL NUMBER | ABCD |
| | STATUS | NORMAL |

(B) Proxy102:DATA MANAGEMENT UNIT

| CI TYPE (LOCAL ID) | PROPERTY | VALUE |
|---|---|---|
| SERVER (svr1) | IP ADDRESS | 192.168.0.4 |
| | NAME | WEB SERVER3 |
| | CPU CLOCK FREQUENCY | 1.5GHz |
| | DISK VOLUME | 150GB |
| | MODEL NUMBER | XYZ |
| | LOAD AVERAGE | 3.0 |
| | AVERAGE CPU UTILIZATION | 63% |
| | STATUS | NORMAL |
| SWITCH (sw1) | IP ADDRESS | 192.168.0.250 |
| | NAME | SWITCH A |
| | MODEL NUMBER | SWZD1 |
| | PORT QUANTITY | 20 |
| | STATUS | NORMAL |
| SWITCH (sw2) | IP ADDRESS | 192.168.0.251 |
| | NAME | SWITCH B |
| | MODEL NUMBER | SWZD2 |
| | PORT QUANTITY | 40 |
| | STATUS | NORMAL |
| STORAGE (sto1) | IP ADDRESS | 192.168.0.10 |
| | NAME | NAS_1 |
| | DISK VOLUME | 4TB |
| | DISK UTILIZATION | 1.3TB |
| | STATUS | NORMAL |

FIG.8

(A)
```
<ci id="sv1">
 <SERVER>
   <IP ADDRESS>192.168.0.1</IP ADDRESS>
   <NAME>WebSERVER1</NAME>
   <MODEL NUMBER>XYZ</MODEL NUMBER>
 </SERVER>
</ci>
```

(B)
```
<ci id="lid0001">
 <SERVER>
   <IP ADDRESS>192.168.0.1</IP ADDRESS>
 </SERVER>
</ci>
```

(C)
```
<ci id="lid0001">
 <SERVER>
   <IP ADDRESS>192.168.0.1</IP ADDRESS>
   <NAME>WEB SERVER1</NAME>
   <CPU CLOCK FREQUENCY>1.5GHz</CPU CLOCK FREQUENCY>
   <DISK VOLUME>150GB</DISK VOLUME>
   <MODEL NUMBER>XYZ</MODEL NUMBER>
   <LOAD AVERAGE>3.2</LOAD AVERAGE>
   <AVERAGE CPU UTILIZATION>60%</AVERAGE CPU UTILIZATION>
   <STATUS>NORMAL</STATUS>
 </SERVER>
</ci>
```

CONFIGURATION MANAGEMENT SYSTEM, PROXY SYSTEM, AND CONFIGURATION MANAGEMENT METHOD

CROSS REFERENCE TO RELATED APPLICATIONS

This application is a continuation application, filed under 35 U.S.C. §111(a), of International Application PCT/JP2008/073390, filed Dec. 24, 2008, the disclosure of which is hereby incorporated by reference.

TECHNICAL FIELD

The present invention relates to a configuration management system, proxy system, and configuration management method that manage resource configurations.

BACKGROUND ART

An FCMDB (federated configuration management database) has been developed to virtually integrate data in different types of DBs (databases). The FCMDB is a DB that can operate plural MDRs (management data repositories) in a cross-sectional manner. An MDR corresponds to an operation management middleware DB that has IT-system operation management data (real data). It may be noted that the type and quantity of data vary from MDR to MDR.

FIG. 20 is a drawing illustrating the outline of a configuration of a configuration management system. An FCMDB integrates data in the MDR for managing design information real data, data in the MDR for managing product information real data, data in the MDR for managing performance information real data, and data in the MDR for managing configuration information real data (e.g., information C", C^, C' may be integrated into C).

An FCMDB integrates data in different MDRs by use of the following functions. Namely, the FCMDB converts, into a common format (i.e., conversion into common format), information about configuration items (hereinafter referred to as "CI": e.g., data about resources constituting an IT system such as a server, a storage, software, and the like) managed on an MDR-specific basis by use of different names and structures. Further, the FCMDB uses a common property having a unique value as a key to identify (i.e., reconcile) a CI that is managed by use of different local IDs in different MDs. Moreover, the FCMDB integrates information items belonging to the same CI (i.e., data integration). It may be noted that the FCMDB actually integrates data when returning data to a client. Further, the FCMDB also manages relationships between CIs ("manage" is a collective term for storing, updating, deleting, and registering).

In an example illustrated in FIG. 21, a product number is managed by different MDRs by using "S/N:XYZ123", "PN:XYZ123", "SERNO:XYZ123", and "SN:XYZ123", respectively. The FCMDB uses this common property as a key to integrate CIs managed by use of different local IDs. Namely, the FCMDB identifies CIs that are a "server" managed by the design information MDR, a "server" managed by the product information MDR, a "host" managed by the performance information MDR, and a "node" managed by the configuration information MDR, and integrates these CIs upon a client request to return it to the client.

A description of the operation of the FCMDB performed upon a client request will be given by referring to FIG. 22.

The FCMDB receives a request (i.e., query) from a client. The FCMDB collects identified CIs relating to the requested data from respective MDRs. These CIs are then integrated, and information about the integrated CI is transmitted to the client as a query result. In an example illustrated in FIG. 22, a client requests data of resource A, resource B, and resource C. In response, the FCMDB collects CIs A", B", and C" from the design information MDR, a CI B* from the product information MDR, CIs A^, B^, and C^ from the performance information MDR, and CIs A', B', and C' from the configuration information MDR (it may be noted that A', A", and A^ have been identified in advance as resource A, and the same applies for resources B and C). Collected data may be all the data in the CIs, or may be partial data in the CIs.

The FCMDB integrates the collected CIs into a query result, which is returned to the client.

The following document is known as a related-art document.

[Patent Document 1] Japanese Laid-open Patent Publication No. 2001-51890

DISCLOSURE OF INVENTION

Problem to be Solved by Invention

The related problem is illustrated in FIG. 23, and will be described below. As illustrated in FIG. 23, a particular MDR may have most data, resulting in access being concentrated on this MDR. The amount of data transfer increases for this MDR. In this manner, an MDR having most data ends up being a bottleneck. An FCMDB may attempt to collect data simultaneously from MDRs, but cannot return a query result to the client until all the CIs are collected. It thus takes time in proportion to the amount of data returned from each MDR.

This problem does not arise if the arrangement is made such that all the data are cached in the FCMDB. However, such an arrangement is not suitable for the management of data in a large-scale system because the data amount becomes excessively large.

The present invention is made to solve the above-noted problem, with the object to provide a configuration management system, proxy system, configuration management method that can distribute loads by providing a proxy (cache) between an FCMDB and MDRs.

Means to Solve the Problem

A configuration management system includes a plurality of databases that store information about resources as configuration items, a configuration management apparatus, a plurality of proxy apparatuses, and a proxy management apparatus, wherein the proxy management apparatus receives configuration items from the plurality of databases, reconciles the receives configuration items, selects a destination proxy apparatus such that processing by the plurality of proxy apparatuses is distributed over the proxy apparatuses, and sends the reconciled configuration items to the selected proxy apparatus, wherein the proxy apparatuses store configuration items sent from the proxy management apparatus, and wherein the configuration management apparatus receives a query from a client, selects among the plurality of proxy apparatuses a proxy apparatus that stores a configuration item that is to serve as a query result, and receives the configuration item from the selected proxy apparatus.

A proxy system includes a plurality of proxy apparatuses, and a proxy management apparatus, wherein the proxy management apparatus receives configuration items from a plurality of databases that store information about resources as configuration items, reconciles the receives configuration items, selects a destination proxy apparatus such that processing by the plurality of proxy apparatuses is distributed over the proxy apparatuses, and sends the reconciled configuration items to the selected proxy apparatus, wherein the proxy apparatuses store configuration items sent from the proxy management apparatus, and send the configuration management apparatus one or more configuration items responsive to a request from the configuration management apparatus that receives a query from a client.

A configuration management method includes a configuration item receiving step of receiving configuration items from a plurality of databases that store information about resources as configuration items, a reconcile step of reconciling the received configuration items, a destination proxy selecting step of selecting a destination proxy apparatus such that processing by the plurality of proxy apparatuses is distributed over the proxy apparatuses, a configuration item sending step of sending the reconciled configuration items to the selected proxy apparatus, a configuration item storing step of storing in the selected proxy apparatus the configuration items that are sent, and a configuration item receiving step of receiving a query from a client, selecting among the plurality of proxy apparatuses a proxy apparatus that stores a configuration item that is to serve as a query result, and receiving the configuration item from the selected proxy apparatus.

BRIEF DESCRIPTION OF DRAWINGS

FIG. 3 is a drawing illustrating an example of the physical configuration of the configuration management system according to the first embodiment.

FIG. 4 is a drawing illustrating an example of data stored in MDRs according to the first embodiment.

FIG. 5 is a drawing illustrating an example of data stored in MDRs according to the first embodiment.

FIG. 6 is a drawing illustrating an example of data stored in a proxy management apparatus and an FCMDB according to the first embodiment.

FIG. 7 is a drawing illustrating an example of data stored in a data management unit of a proxy apparatus according to the first embodiment.

FIG. 8 is a drawing illustrating an example of electronic message data exchanged between the MDRs, the proxy management apparatus, the proxy apparatuses, and the FCMDB according to the first embodiment.

BEST MODE FOR CARRYING OUT THE INVENTION

[First Embodiment]

Figure 1:
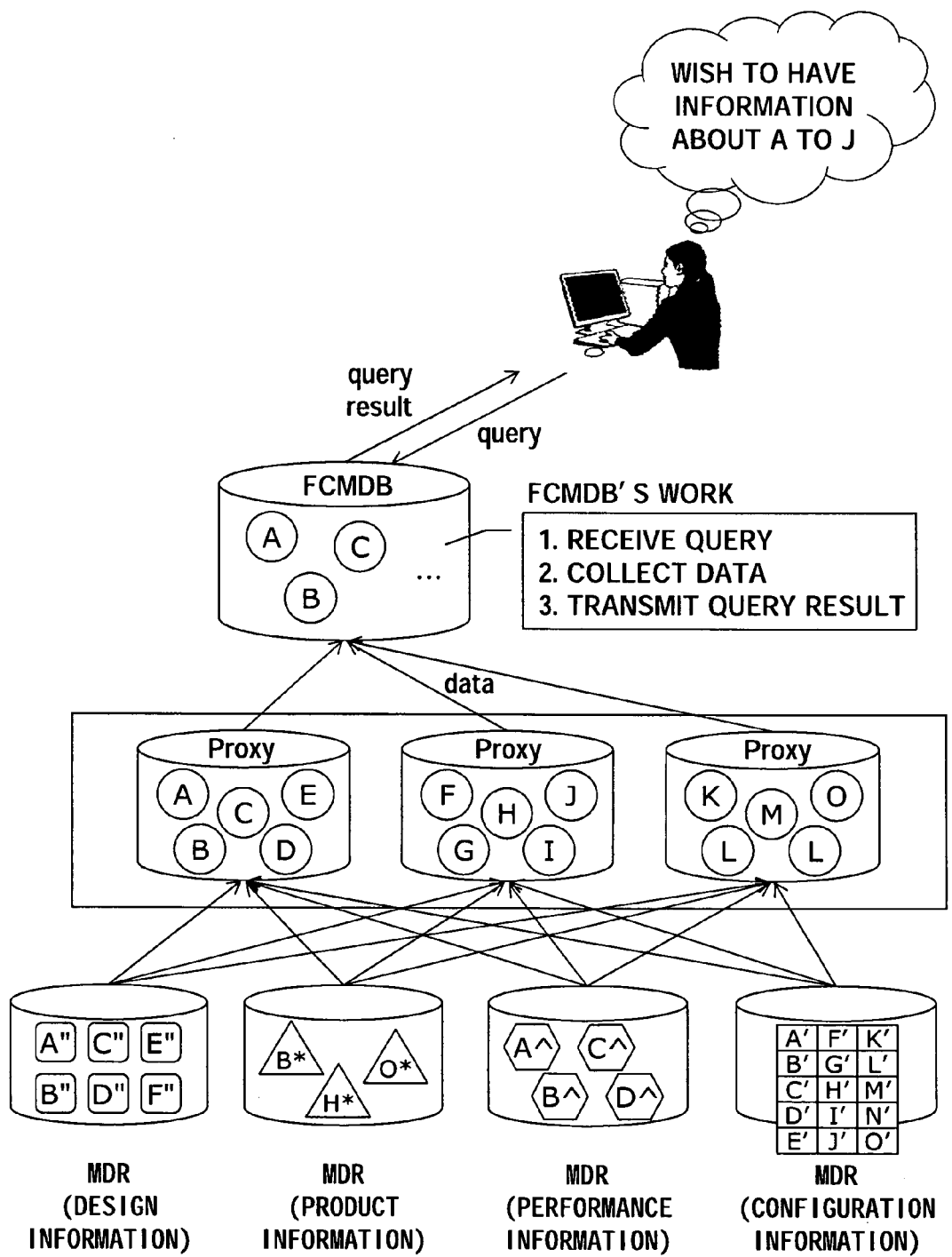
FIG. 1 is a drawing for illustrating the overview of a first embodiment.

In the following, a first embodiment will be described with reference to drawings. FIG. 1 is a drawing for illustrating the overview of the first embodiment.

In the first embodiment, a proxy system is situated between an FCMDB and MDRs. The proxy system includes a plurality of proxy apparatuses that store reconciled and integrated real data. The proxy apparatuses store configuration items (CIs) in a distributed manner, such that data integration has been performed for each CI. The MDRs have the same configuration as in the related art.

Figure 2:
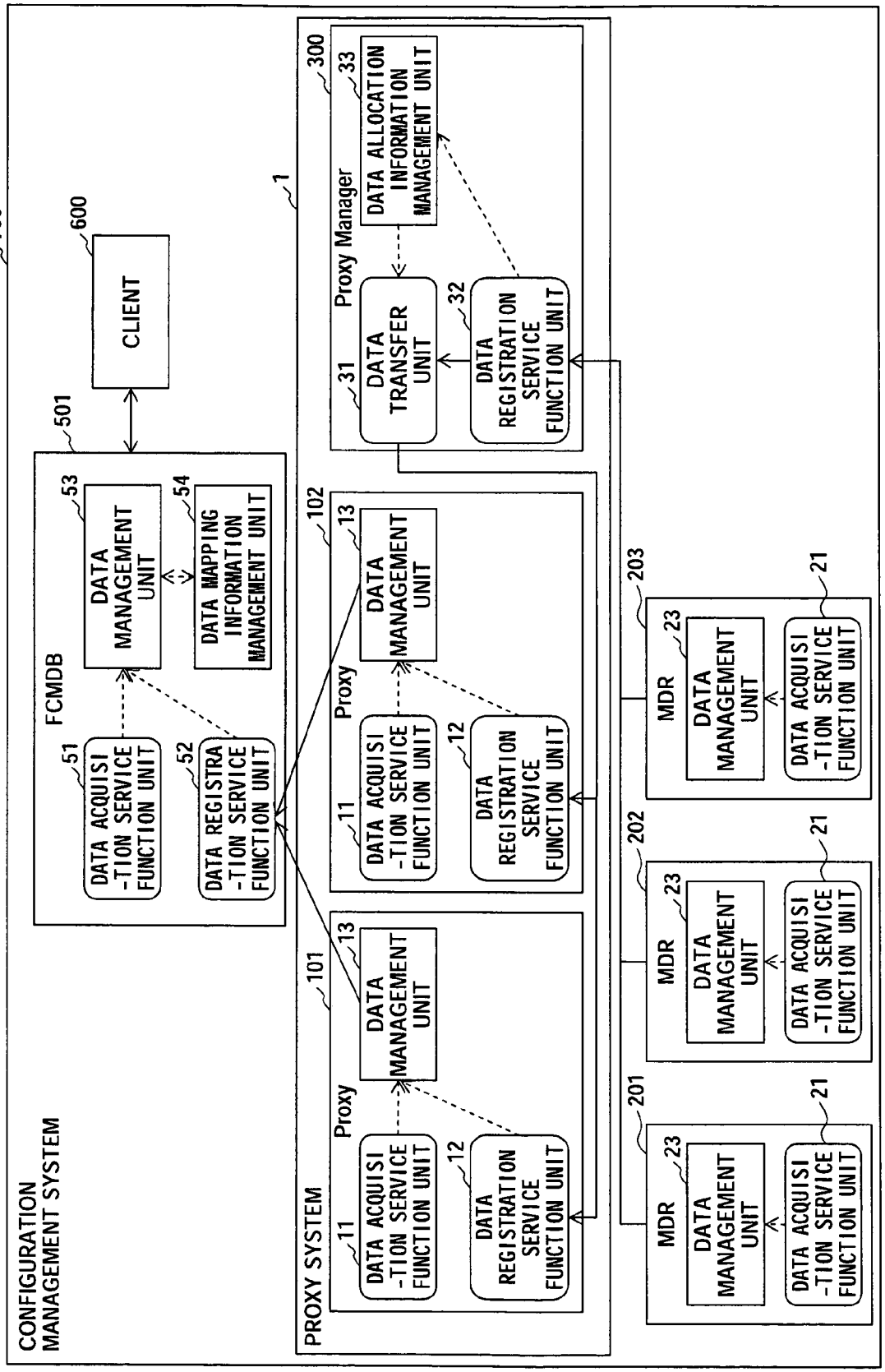
FIG. 2 is a drawing illustrating an example of the functional configuration of a configuration management system according to the first embodiment.

In the following, a description will be given of an example of the functional configuration of a configuration management system according to the first embodiment by referring to FIG. 2.

A configuration management system 700 of the first embodiment includes an FCMDB (configuration management apparatus) 501, a proxy system 1, and a plurality of MDRs (i.e., MDR 201, MDR 202, MDR 203) (databases).

The MDRs 201, 202, and 203 are databases that store information about resources as configuration items. Each of the MDRs 201, 202, and 203 includes a data acquisition service function unit 21 and a data management unit 23. The data acquisition service function unit 21 acquires data about IT resources from an external system. The data management unit 23 is a database function of the MDRs 201, 202, and 203, and stores data acquired by the data acquisition service function unit 21. Further, the data management unit 23 transmits the stored data as CIs to a proxy management apparatus 300 in the proxy system 1.

In the following, a description will be given of the internal configuration of the proxy system 1. The proxy system 1 includes two proxy apparatuses 101 and 102 and the proxy management apparatus 300 for managing these proxy apparatuses. The proxy apparatuses 101 and 102 have substantially the same configuration with each other. In FIG. 1 and subsequent drawings, a proxy apparatus is denoted as "PROXY", and the proxy management apparatus is denoted as "PROXY MANAGER".

The proxy management apparatus 300 acquires configuration items from the MDRs 201, 202, and 203, and reconcile the acquired configuration items. Further, the proxy management apparatus 300 selects a proxy apparatus as a transmission destination such that processing in the proxy apparatuses 101 and 102 is distributed over the proxy apparatuses, i.e., the numbers of configuration items stored in the proxy apparatuses 101 and 102 are substantially equal to each other. The proxy management apparatus 300 then transmits reconciled configuration items to the selected proxy apparatus.

The proxy management apparatus 300 includes a data transfer unit 31, a data registration service function unit 32, and a data allocation information management unit 33. The data registration service function unit 32 receives CIs transmitted from the MDRs 201, 202, and 203. The data allocation information management unit 33 reconciles the CIs received by the data registration service function unit 32. Further, the data allocation information management unit 33 selects a proxy apparatus as a data allocation destination. The data transfer unit 31 transfers CIs to the selected proxy apparatus (i.e., the allocated proxy apparatus).

The proxy apparatuses 101 and 102 store the configuration items sent from the proxy management apparatus 300, and transmit CIs responsive to a request from the FCMDB 501 to the FCMDB 501.

Each of the proxy apparatuses 101 and 102 includes a data acquisition service function unit 11, a data registration service function unit 12, and a data management unit 13. The data registration service function unit 12 receives CIs from the proxy management apparatus 300. The data management unit 13 is a database function for storing the CIs received by the data registration service function unit 12. The data management unit 13 returns requested CIs to the proxy management apparatus 300 based on a data request from the proxy management apparatus 300 that is received by the data acquisition service function unit 11. The data acquisition service function unit 11 receives a data request from the FCMDB 501.

The FCMDB 501 receives a query from a client 600. The FCMDB 501 identifies, among the proxy apparatuses 101 and 102, the proxy apparatus that stores one or more configuration items that are to serve as a query result. The FCMDB 501 receives CIs from the identified proxy apparatus, and transmits the received CIs to the client 600 as a query result.

The FCMDB 501 includes a data acquisition service function unit 51, a data registration service function unit 52, a data management unit 53, and a data mapping information management unit 54.

The data acquisition service function unit 51 receives a query from the client 600. The data acquisition service function unit 51 also returns a query result to the client 600. The data registration service function unit 52 receives part of the CIs from the proxy system 1 at the time of data registration. The data management unit 53 is a database function of the FCMDB 501, and stores in a database the part of the CIs received by the data registration service function unit 52. Further, the data mapping information management unit 54 stores, in a memory unit, allocation information regarding the CIs and the proxy apparatuses 101 and 102 of the proxy system 1.

In the following, a physical configuration of the configuration management system 700 will be described by referring to FIG. 3. The configuration management system 700 serves to manage system configuration information about a management-target IT system 601. The MDRs 201, 202, and 203, the proxy apparatuses 101 and 102, the proxy management apparatus 300, and the FCMDB 501 in the configuration management system 700 are connected to each other through an operation-management-system network 800 to conduct data communication with each other. The MDRs 201, 202, and 203, the proxy apparatuses 101 and 102, the proxy management apparatus 300, and the FCMDB 501 are servers (i.e., computers) that include a CPU (Central Processing Unit), volatile and nonvolatile memory devices, and a communication interface. The function blocks illustrated in FIG. 2 are implemented through the collaboration of programs stored in the memory devices with hardware resources such as the CPU, memory devices, and communication interface.

Various types of data stored and used in the configuration management system 700 are illustrated in FIG. 4 through FIG. 7.

A description will be first given of various types of data stored in the MDRs 201, 202, and 203 by referring to FIG. 4 and FIG. 5. The MDRs 201, 202, and 203 store various types of data as illustrated in FIG. 4 and FIG. 5 in a DB.

As illustrated in FIG. 4-(A), the MDR 201 stores resource design information separately for each resource in the management-target IT system 601. In the first embodiment, the MDR 201 stores each resource (server) ID as a CI type, and further stores properties inclusive of an IP address, a resource name, and a model number as well as values thereof on a CI-type-specific basis. It may be noted that CI types such as sv1, sv2, and so on are local IDs that are valid only within the MDR 201.

As illustrated in FIG. 4-(B), the MDR 202 stores resource performance information separately for each resource in the management-target IT system 601. In the first embodiment, the MDR 202 stores each resource (server) ID as a CI type, and further stores properties inclusive of an IP address, a load average, and an average CPU utilization as well as values thereof on a CI-type-specific basis. It may be noted that CI types such as mdr2_id1, mdr2_id2, and so on are local IDs that are valid only within the MDR 202.

As illustrated in FIG. 5, the MDR 203 stores resource configuration information separately for each resource in the management-target IT system 601. In the first embodiment, the MDR 203 stores each resource (server) ID (server1, server2, switch1, etc.) as a CI type. In the case of a CI type indicative of a server, the MDR 203 further stores properties inclusive of an IP address, an apparatus name, a CPU clock frequency, a disk volume, and a status as well as values thereof. In the case of a CI type indicative of a switch, the MDR 203 further stores properties inclusive of an IP address, an apparatus name, a model number, a port quantity, and a status as well as values thereof. In the case of a CI type indicative of a storage, further, the MDR 203 stores properties inclusive of an IP address, an apparatus name, a disk volume, a disk utilization, and a status as well as values thereof. It may be noted that CI types such as sever1, server2, switch1, and so on are local IDs that are valid only within the MDR 203.

Among the CIs stored in the MDRs 201, 202, and 203, a common property is the IP address. In the first embodiment, thus, the IP address is used as a common property.

FIG. 6 is a drawing illustrating data stored in the proxy management apparatus 300 and the FCMDB 501.

FIG. 6-(A) illustrates various types of data managed by the data allocation information management unit 33 of the proxy management apparatus 300. The data allocation information management unit 33 stores an allocated destination proxy, a common property type, and a common property value for each CI type, thereby allocating a given CI type to a proxy apparatus.

The data management unit 53 of the FCMDB 501 stores a CI type (global ID), a common property type, and a value thereof such that they are associated with each other (see FIG. 6-(B)). The data mapping information management unit 54 of the FCMDB 501 stores a CI type (global ID) and a correspondence relationship between a proxy apparatus and a local ID for management within the proxy apparatus (see FIG. 6-(C)).

In the following, a description will be given of data stored in the data management unit 13 of the proxy apparatuses 101 and 102 by referring to FIG. 7. FIG. 7-(A) illustrates data stored in the proxy apparatus 101, and FIG. 7-(B) illustrates data stored in the proxy apparatus 102.

The data management unit 13 stores property types and property values for each CI type such as lid0001, lid0002, svr1, and so on. The property types and property values are obtained by integrating data in the MDRs 201, 202, and 203. lid0001, lid0002, and so on are local IDs that are valid only within a proxy apparatus.

FIG. 8 is a drawing illustrating electronic message data exchanged between the MDR 201, the proxy management apparatus 300, the proxy apparatus 101, and the FCMDB 501. As illustrated in FIG. 8, exchanged electronic messages are provided in a format in which predefined tags are attached.

FIG. 8-(A) illustrates an example of an electronic message format that is exchanged between the MDR 201 and the proxy management apparatus 300 and between the proxy management apparatus 300 and the proxy apparatus 101 at the time of new data registration. Upon data being registered in the MDR 201, the MDR 201 sends the local ID used in the MDR 201 and the values of various types of properties including at least the common property to the proxy management apparatus 300 together with predetermined tags attached thereto. The proxy management apparatus 300 identifies an allocated destination proxy apparatus based on the common property (i.e., IP address in the first embodiment) contained in the received electronic message and the correspondence relationship stored in the data allocation information management unit 33. The proxy management apparatus 300 sends the received electronic message as it is to the identified proxy apparatus (i.e., proxy apparatus 101 in this example).

Upon receiving the electronic message, the proxy apparatus 101 sends the FCMDB 501 an electronic message in which predetermined tags are attached to the common property value and a local ID used in the proxy apparatus 101, i.e., the electronic message as illustrated in FIG. 8-(B). At the time of new registration, the proxy apparatus 101 creates an electronic message for transmission to the FCMDB 501 by assigning a new local ID, and sends it to the FCMDB 501. The common property included in the transmitted electronic message may already be registered in the data management unit 13 (i.e., not new registration). In such a case, an electronic message for transmission to the FCMDB 501 is created by attaching the relevant local ID and transmitted to the FCMDB 501. Alternatively, no transmission may be performed in the absence of new registration since registration has already been made in the FCMDB 501.

Upon receiving the electronic message, the FCMDB 501 generates a global ID, and creates a correspondence between the generated global ID, the local ID included in the electronic message, and the sender proxy apparatus (i.e., proxy apparatus 101 in this example) for storage in the data mapping information management unit 54 (see FIG. 6-(C)). The FCMDB 501 also causes the data management unit 53 to store the correspondence between the global ID and the common property value (see FIG. 6-(B) also).

FIG. 8-(C) illustrates an example of an electronic message format that is transmitted from the proxy apparatus 101 to the FCMDB 501 as a query result upon a query request being issued from the client 600. When the client 600 issues a query regarding the IP address "192.168.0.1" (or issues a query indicative of a global ID), the proxy apparatus 101 sends the properties and property values stored in the data management unit 13 to the FCMDB 501 as a query result by attaching predetermined tags.

The example illustrated in FIG. 8 has been explained with reference to electronic message data that is exchanged between the MDR 201, the proxy management apparatus 300, the proxy apparatus 101, and the FCMDB 501. The same or similar explanation also applies in the case of the MDR 202 or 203 and the proxy apparatus 102.

Figure 9:
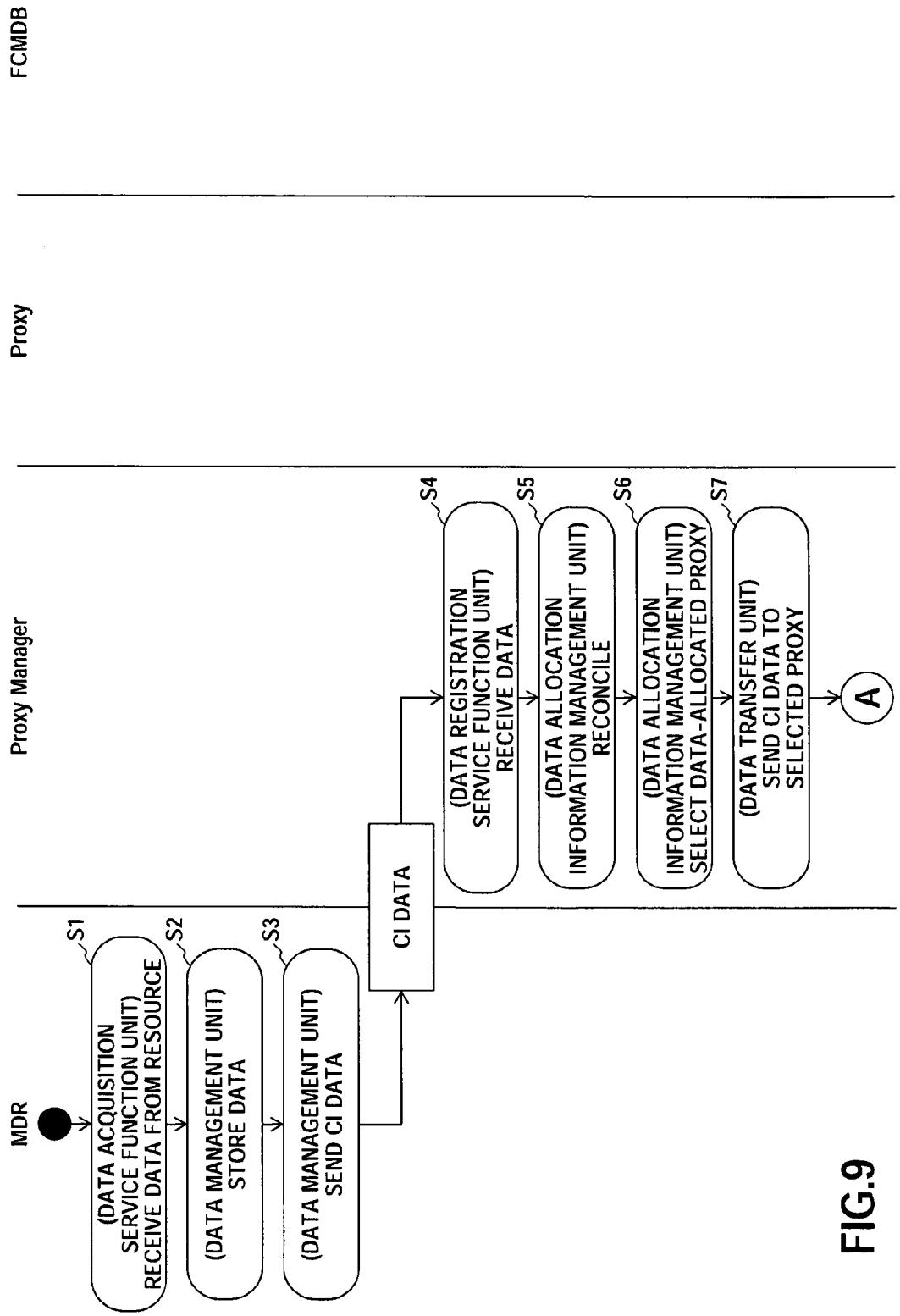
FIG. 9 is a flowchart illustrating an operation performed by the configuration management system when new resource registration is performed according to the first embodiment.
Figure 10:
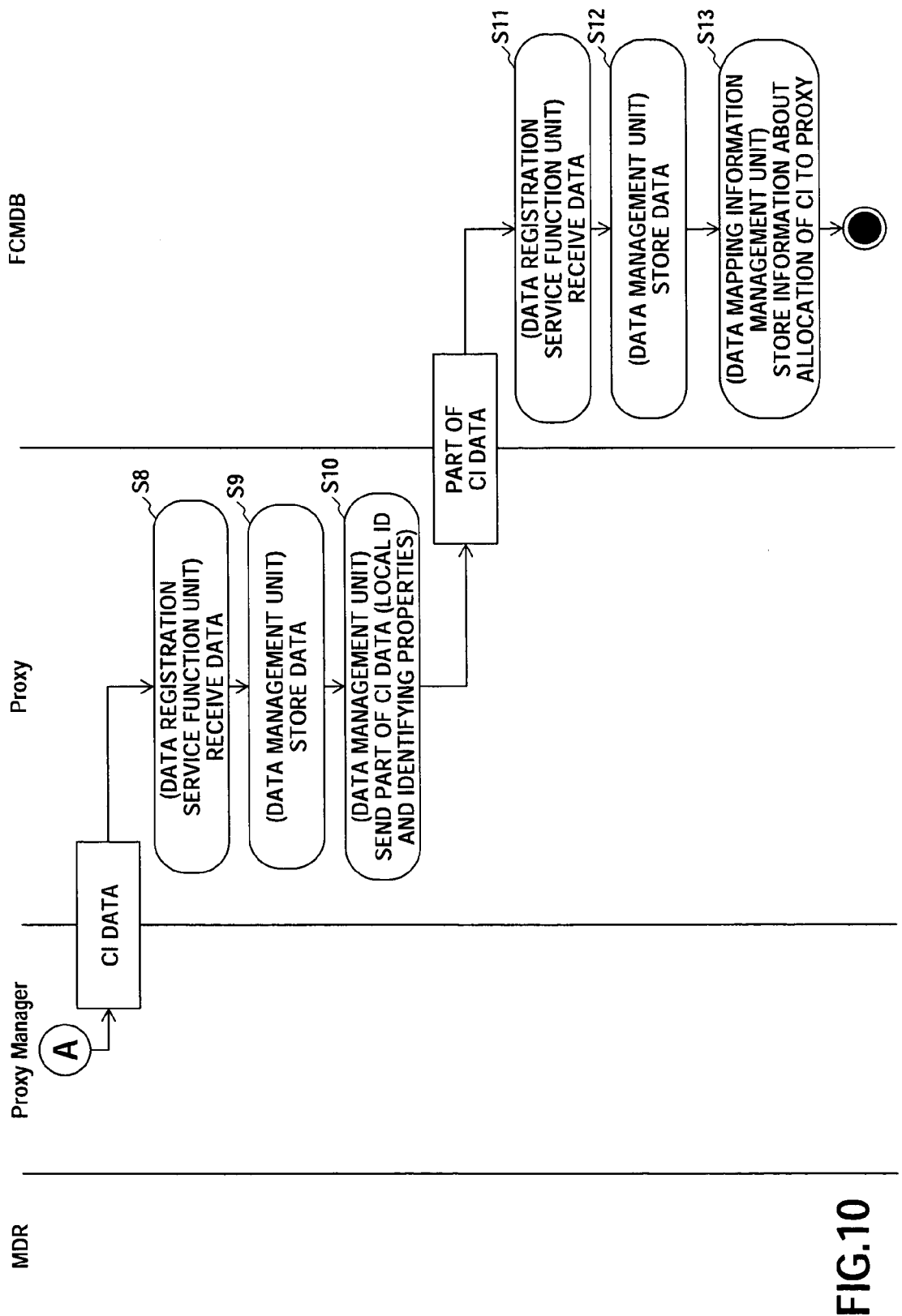
FIG. 10 is a flowchart illustrating an operation performed by the configuration management system when new resource registration is performed according to the first embodiment.

FIG. 9 and FIG. 10 are flowcharts illustrating an operation performed by the configuration management system 700 when new resource registration is performed. A description will be given of the operation of the configuration management system 700 by referring to FIG. 9 and FIG. 10. In the flowcharts hereinafter illustrated, a function unit of an apparatus that is specified in parentheses performs a noted step. Even when function units having the same name are used, the passage "(data registration service function unit)" for S4 means that the data registration service function unit 32 of the proxy management apparatus 300 performs S4 while the passage "(data registration service function unit)" for S8 means that the data registration service function unit 12 of the proxy apparatus 101 (or proxy apparatus 102) performs S8. Further, the following descriptions will be given such that an apparatus is referred to as an agent that performs an action for the sake of convenience of explanation. An actual action, however, is performed by the function unit specified in parentheses in the figures upon exerting the function thereof.

Moreover, the following descriptions based on the flowcharts will be given with reference to operations between the FCMDB 501, the proxy apparatus 101, the proxy management apparatus 300, and the MDR 201. The same or similar operations are performed in the case of the proxy apparatus 102 and the MDR 202 or 203.

The MDR 201 receives data of the resources constituting the management-target IT system 601 from a user or an external system (S1). Further, the MDR 201 stores the received data by use of the configuration as illustrated in FIG. 4-(A) (S2), and transmits CIs (i.e., CI types, property types, and property values) to the proxy management apparatus 300 (S3).

The proxy management apparatus 300 receives the CIs from the MDR 201 (S4), and reconcile the CIs (S5). After this, the proxy management apparatus 300 selects proxy apparatuses as data allocated destinations based on the table stored in the data allocation information management unit 33 (S6). When the common property is new, the proxy management apparatus 300 selects proxy apparatuses in a round-robin manner such that data are evenly allocated, i.e., CI quantities become even, followed by registering the correspondence relationships in a table.

The proxy management apparatus 300 transmits CI data (S7) to a selected proxy apparatus (e.g., proxy apparatus 101) that is selected in S6.

The proxy apparatus 101 receives the CI data (S8), and stores the data (S9). The data is integrated in S9. The storage format used here is the same as the one illustrated in FIG. 7-(A). Further, the proxy apparatus 101 transmits part of the CI data (i.e., local ID and common property) to the FCMDB 501 (S10).

The FCMDB 501 receives the part of the CI data (S11), and stores the received data as illustrated in FIG. 6-(B) (S12), followed by storing allocation information regarding CIs and the proxy apparatus as illustrated in FIG. 6-(C).

Figure 11:
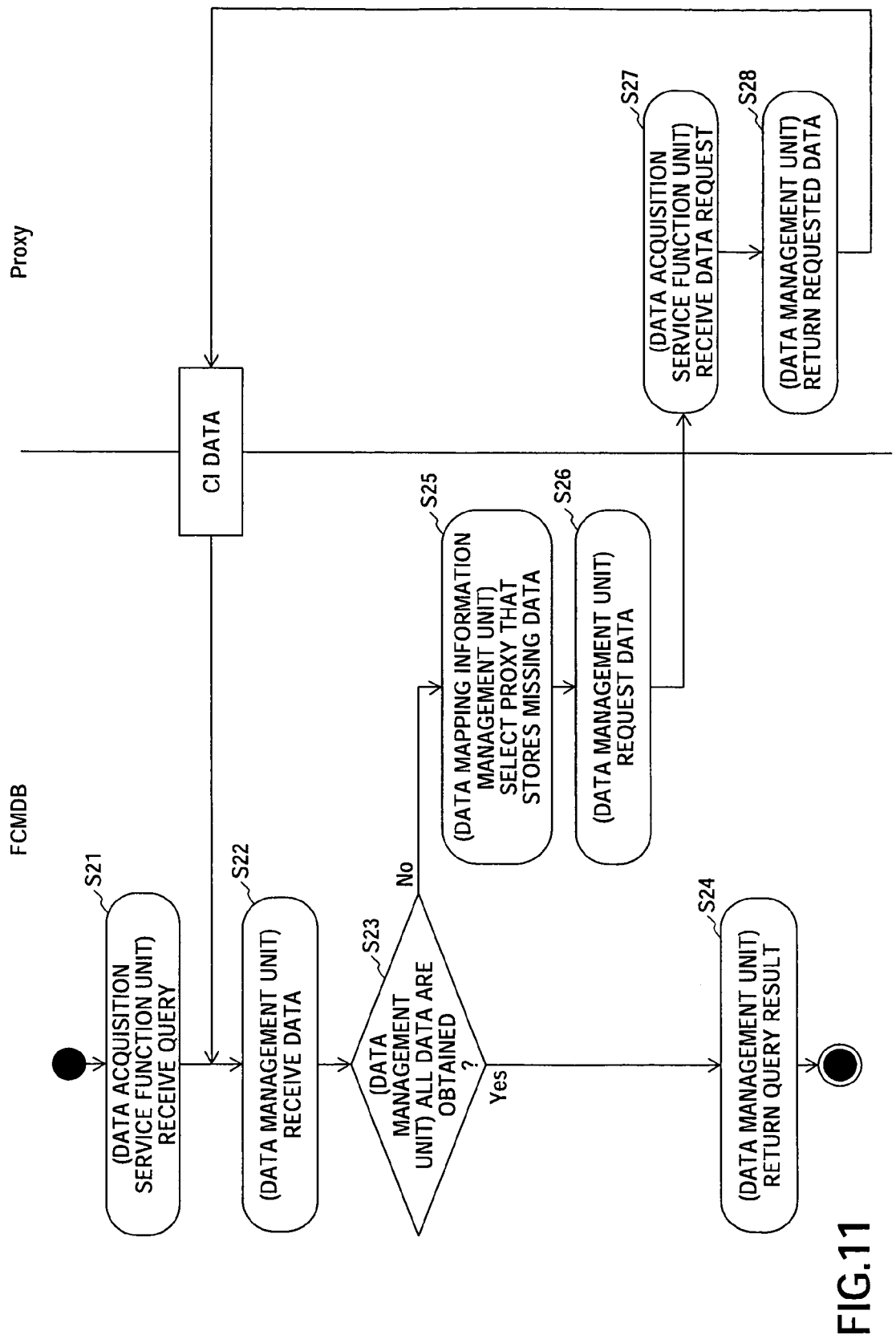
FIG. 11 is a flowchart illustrating an operation performed when a client issues a query according to the first embodiment.

In the following, a description will be given of the operation performed when a query is issued from the client 600 by referring to the flowchart of FIG. 11.

The FCMDB 501 receives a query issued by the client 600 (S21). The FCMDB 501 retrieves relevant data from the data management unit 53 (S22) when a result for the query is stored in the local database (some properties of the CIs are stored in the FCMDB 501 in the first embodiment). If all the data to be transmitted as a query result are obtained (Yes in S23), the FCMDB 501 returns the query result to the client 600 (S24). With this, the procedure comes to an end.

If all the data are not yet obtained (No in S23), the FCMDB 501 selects a proxy apparatus that has missing data based on the table stored in the data mapping information management unit 54 (S25), followed by requesting the selected proxy apparatus (e.g., proxy apparatus 101 may be selected) to provide the missing data (S26).

The proxy apparatus 101 receives the data request (S27), and returns the data stored in the data management unit 13 to the FCMDB 501 (S28).

The FCMDB 501 receives the returned data (S22), and checks again whether all the data are obtained (S23). If all the data are obtained (Yes in S23), the query result is returned to the client 600 (S24). With this, the procedure comes to an end. If all the data are not yet obtained (No in S23), the processes of S25 through S28 are performed with respect to other proxy apparatuses.

According to the first embodiment, the provision of plural proxy apparatuses that store reconciled, integrated data in a distributed manner on a CI-specific basis between an FCMDB and MDRs can distribute data in the proxy layer.

[Second Embodiment]

In the first embodiment, the same number of CIs are allocated to each of the proxy apparatuses through round robin. When a query directed to one or more particular CIs are frequently issued, the proxy apparatus having these CIs allocated thereto may receive excessive accesses, resulting in lower performance. The second embodiment provides a configuration management system that can distribute loads even when queries directed to particular CIs are frequently issued.

Figure 12:
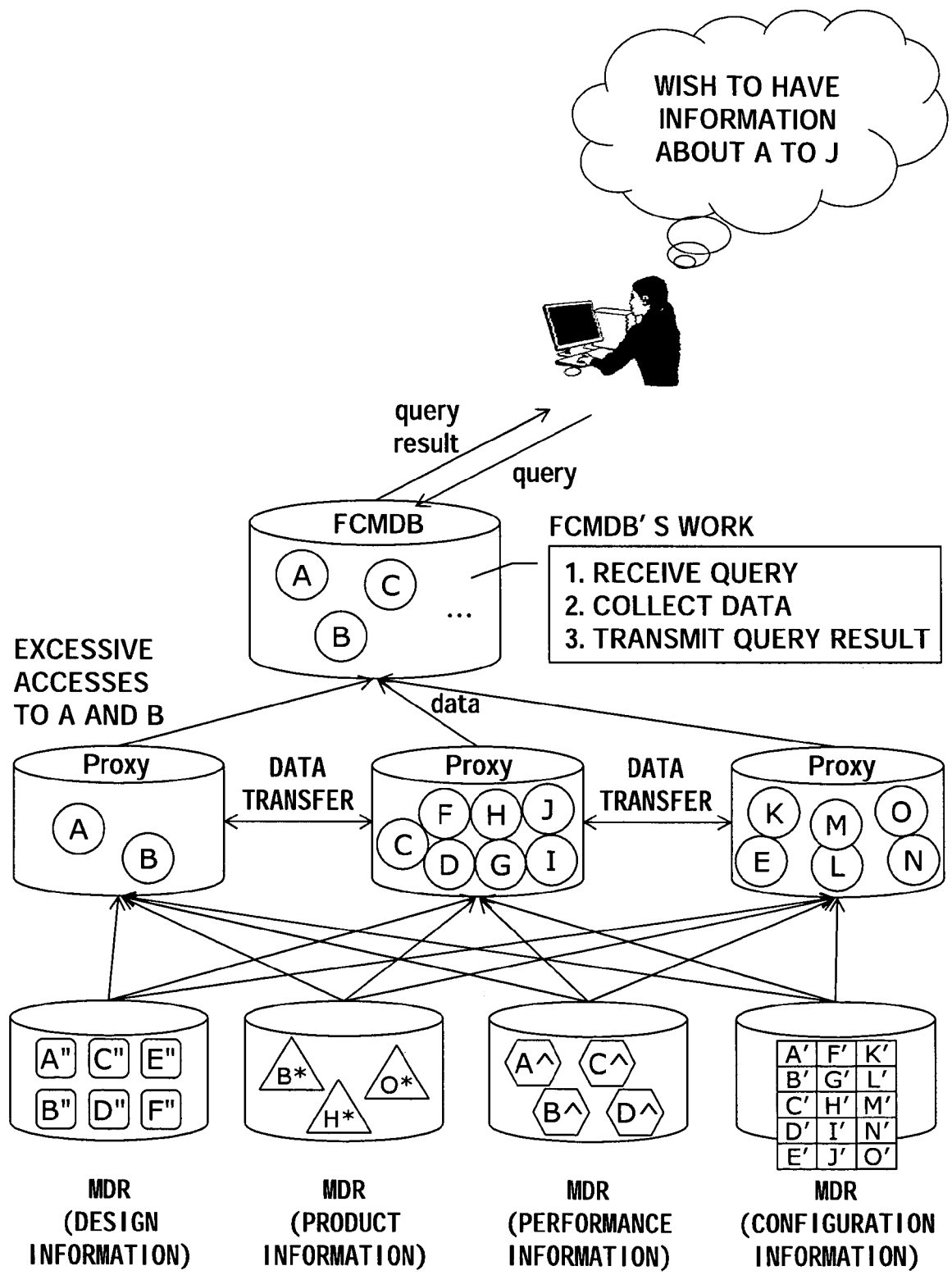
FIG. 12 is a drawing for illustrating the overview of a second embodiment.

FIG. 12 is a drawing illustrating an example of the outline of the second embodiment. When excessive accesses are directed to CIs that are A and B, the proxy system of the second embodiment reallocates CIs other than A and B from the excessively accessed proxy apparatus to other proxy apparatuses. With this arrangement, processing loads of the proxy apparatuses can be distributed.

Figure 13:
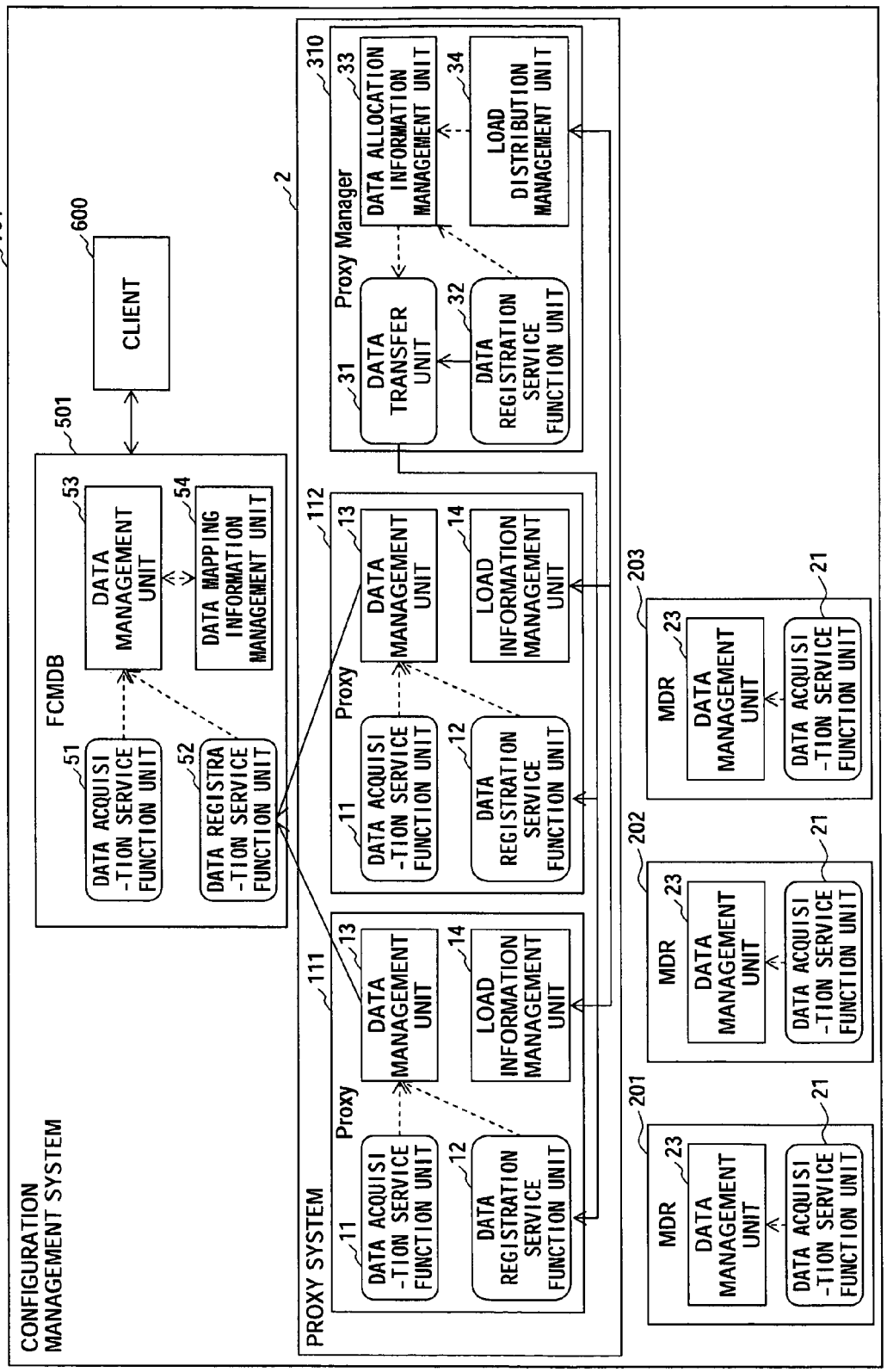
FIG. 13 is a drawing illustrating an example of the functional configuration of a configuration management system according to the second embodiment.

FIG. 13 is a block diagram illustrating a configuration management system of the second embodiment. A proxy system 2 of a configuration management system 701 includes proxy apparatuses 111 and 112 and a proxy management apparatus 310. The proxy management apparatus 310 includes a load distribution management unit 34. Each of the proxy apparatuses 111 and 112 includes a load information management unit 14.

The load distribution management unit 34 of the proxy management apparatus 310 transmits a collection request to the load information management unit 14 of each proxy apparatus to collect load information (e.g., the data amount of each stored CI, the data transfer amount of each CI, CPU utilization, access load, etc.). The load distribution management unit 34 of the proxy management apparatus 310 receives load information collected by the load information management unit 14 of each proxy apparatus, and adjusts CI data distribution based on the load information about each proxy apparatus, followed by instructing each proxy apparatus to move CI data.

The load information management unit 14 of each proxy apparatus receives the collection request from the load distribution management unit 34 of the proxy management apparatus 310, and collects local load information, followed by transmitting the collected load information to the load distribution management unit 34.

In addition to what is described above, the function units of the proxy apparatuses 111 and 112 and the FCMDB 501 in the second embodiment perform additional processes for reallocating CIs. The additional processes will be described with reference the following flowcharts.

Figure 14:
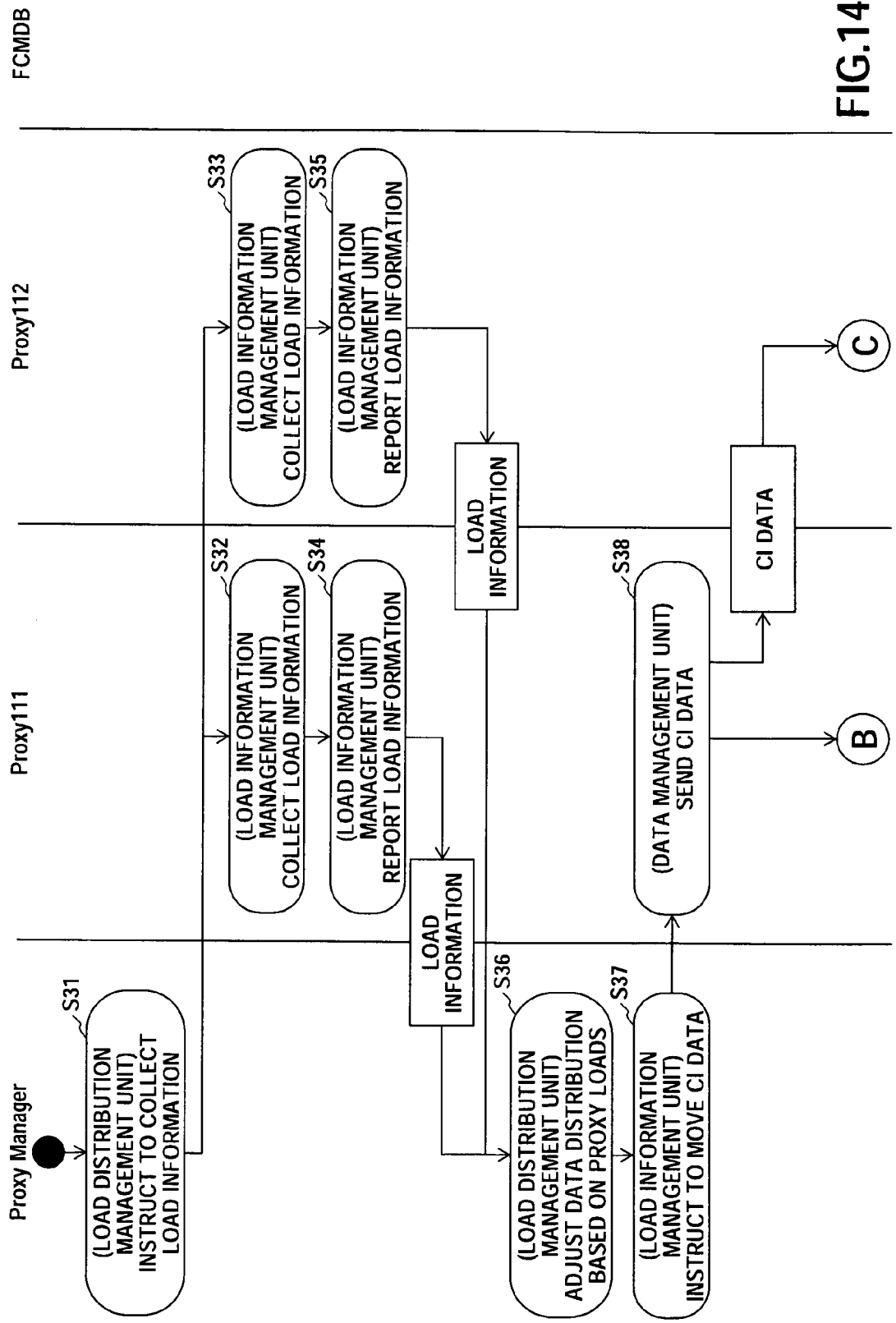
FIG. 14 is a drawing illustrating an example of an operation performed by the configuration management system according to the second embodiment.
Figure 15:
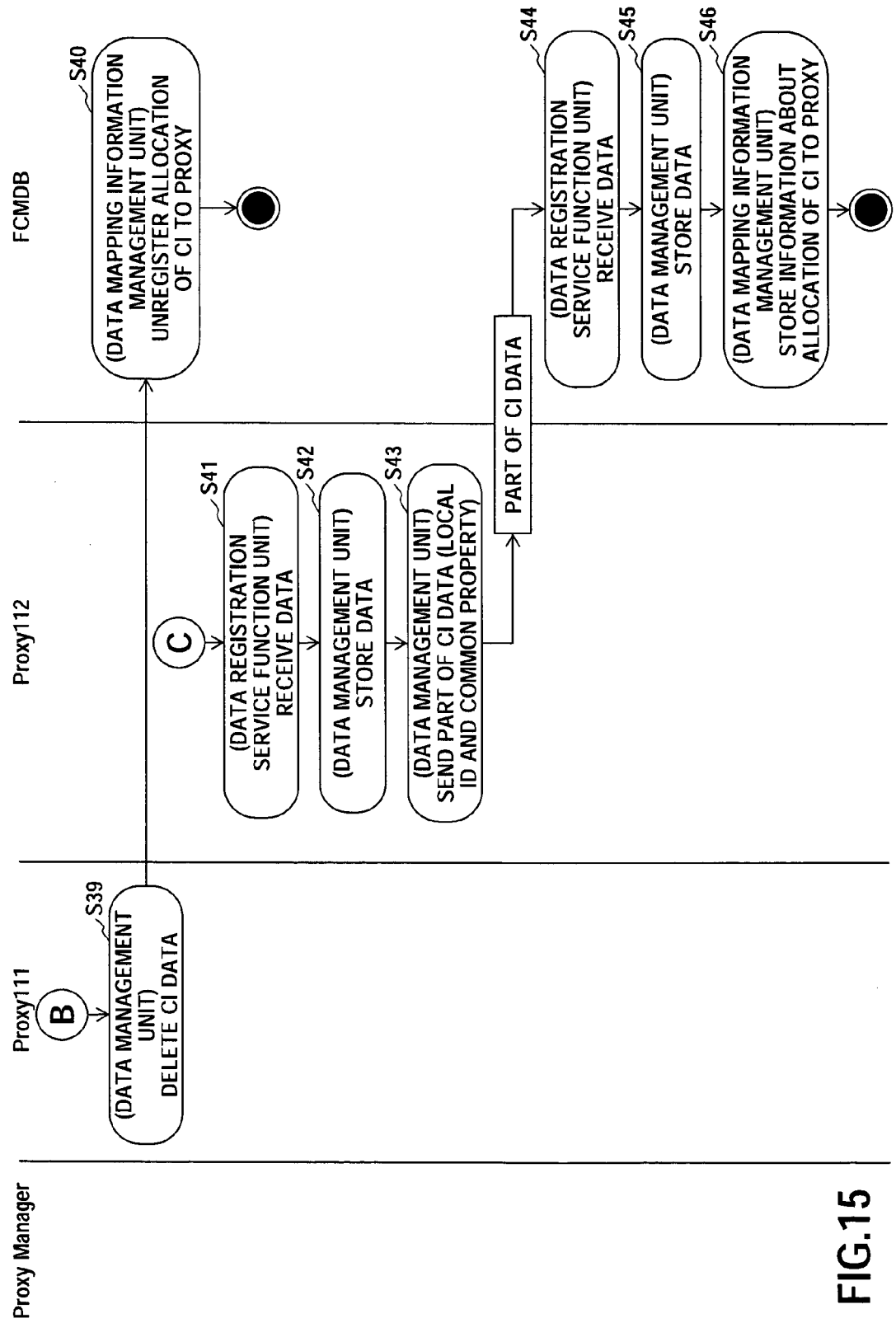
FIG. 15 is a drawing illustrating an example of an operation performed by the configuration management system according to the second embodiment.

A description will be given of the operation of the configuration management system 701 according to the second embodiment by referring to the flowcharts of FIG. 14 and FIG. 15.

The proxy management apparatus 310 requests (S31) the proxy apparatuses 111 and 112 to collect load information in response to an instruction from the client 600 or at a specified time or at intervals specified by a user in advance such as constant intervals or the time at which the configuration management system 701 is not used by the user. Each of the proxy apparatuses 111 and 112 collects local load information in response to the load information collection request (S32, S33), followed by sending the load information to the proxy management apparatus 310 (S34, S35).

The proxy management apparatus 310 adjusts data allocation based on the load information about the proxy apparatuses (S36). The load information may indicate the data transfer amount of each CI. In this case, the proxy management apparatus 310 divides the total amount of data transfer by the number of proxy apparatuses to calculate an average of data transfer amounts. The proxy management apparatus 310 then adjusts CI allocation such that the data transfer amounts in the proxy apparatuses become close to the average. Further, the proxy management apparatus 310 takes into account differences in machine specifications between the proxy apparatuses if such differences exist. For example, CPU specifications may differ from proxy apparatus to proxy apparatus. In such a case, the proxy management apparatus 310 may adjust the total data transfer amount based on the CPU specifications (e.g., frequency). Various methods for adjustment in addition to what is described above may be devised.

The proxy management apparatus 310 instructs the proxy apparatus 111 and the proxy apparatus 112 to move CIs (S37). It may be noted that the electronic instruction message sent to the proxy apparatuses 111 and 112 may include information about which CIs are to be moved. In the following, a description will be given of an example in which CIs are moved from the proxy apparatus 111 to the proxy apparatus 112.

The proxy apparatus 111 transmits (S38) to the proxy apparatus 112 the CIs that are indicated as CIs to be moved by the move instruction from the proxy management apparatus 310. After this, the proxy apparatus 111 deletes the stored CIs that have been transmitted (S39). In response to instruction from the proxy apparatus 111, for example, the FCMDB 501 unregisters the allocation of the CIs to the proxy apparatus (S10).

The proxy apparatus 112 receives the CIs sent from the proxy apparatus 111 (S41), and stores the received CIs as its own CIs (S42). After this, the proxy apparatus 112 attaches local IDs to the stored CIs according to need, and sends part of the CIs (i.e., common property and local ID) to the FCMDB 501 (S43).

The FCMDB 501 receives the part of the CIs sent from the proxy apparatus 112 (S44), and stores the received part of the CIs (S45). Thereafter, the FCMDB 501 stores information about the allocation of the moved CIs to the proxy apparatus 112 (S46).

In this manner, the load distribution function is provided to redistribute data in response to load statuses when an uneven access pattern is observed. With this arrangement, the configuration management system 701 can provide data to the user even faster.

[Third Embodiment]

In a third embodiment, a description will be given of a configuration management system that uses the proxy system to manage version numbers of data backups Conventionally, an FCMDB alone or each MDR manages backup version numbers. This gives rise to a problem in that loads are concentrated on the FCMDB or a particular MDR. The configuration management system of the third embodiment can perform version number management within the proxy system, thereby evenly distributing loads.

Figure 16:
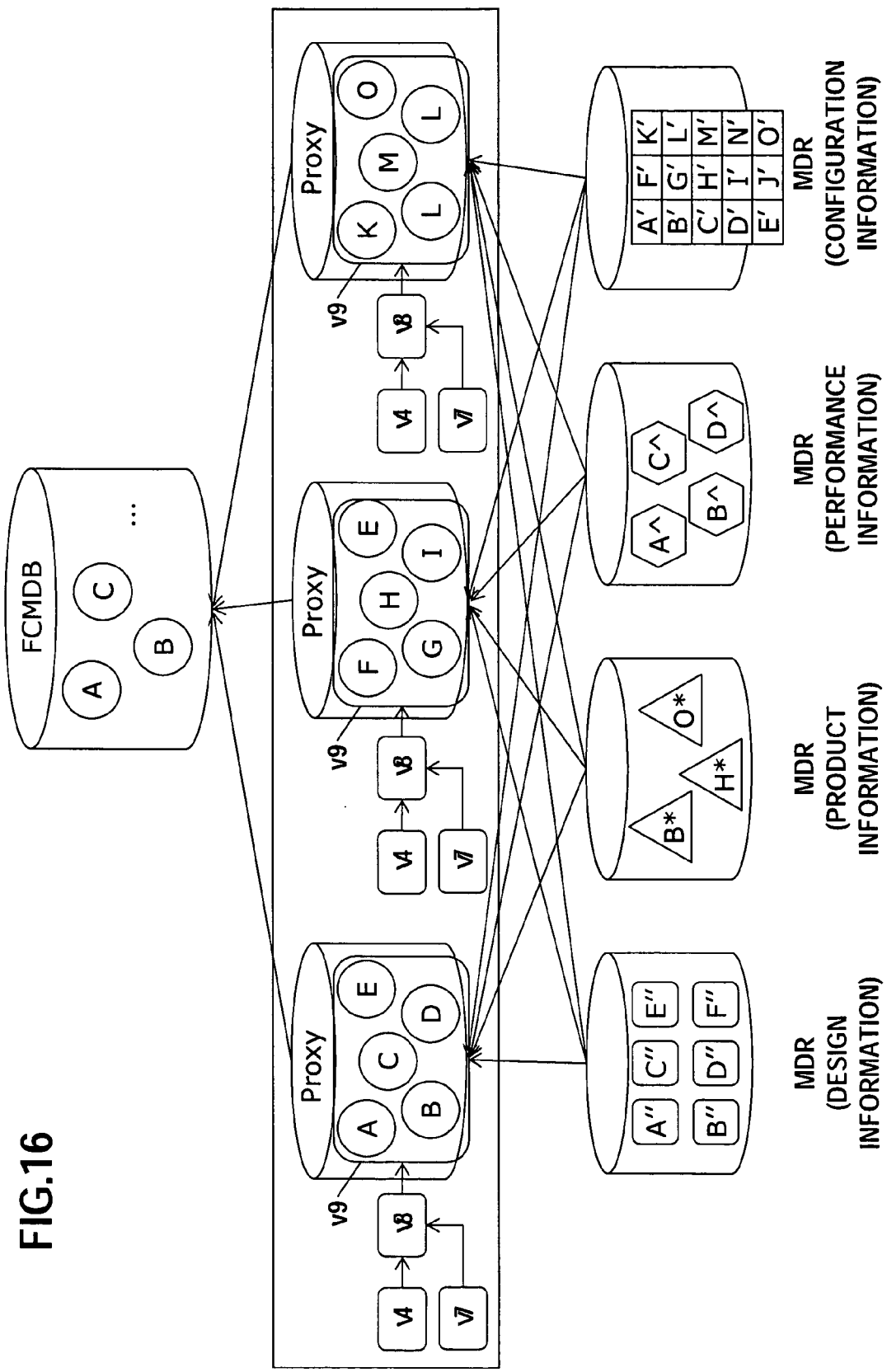
FIG. 16 is a drawing for illustrating the overview of a third embodiment.

FIG. 16 is a drawing illustrating an example of the outline of third embodiment. In an example illustrated in FIG. 16, the current version (i.e., version number) may be 9 ("version n" is denoted as "vn" in FIG. 16). An immediately preceding version 8 is obtained by merging version 4 and version 7. In the configuration management system of the third embodiment, apparatuses in the proxy system do not perform backup at respective, different timings, but perform backup simultaneously so as to distribute loads and to prevent data inconsistency caused by differences between versions.

Figure 17:
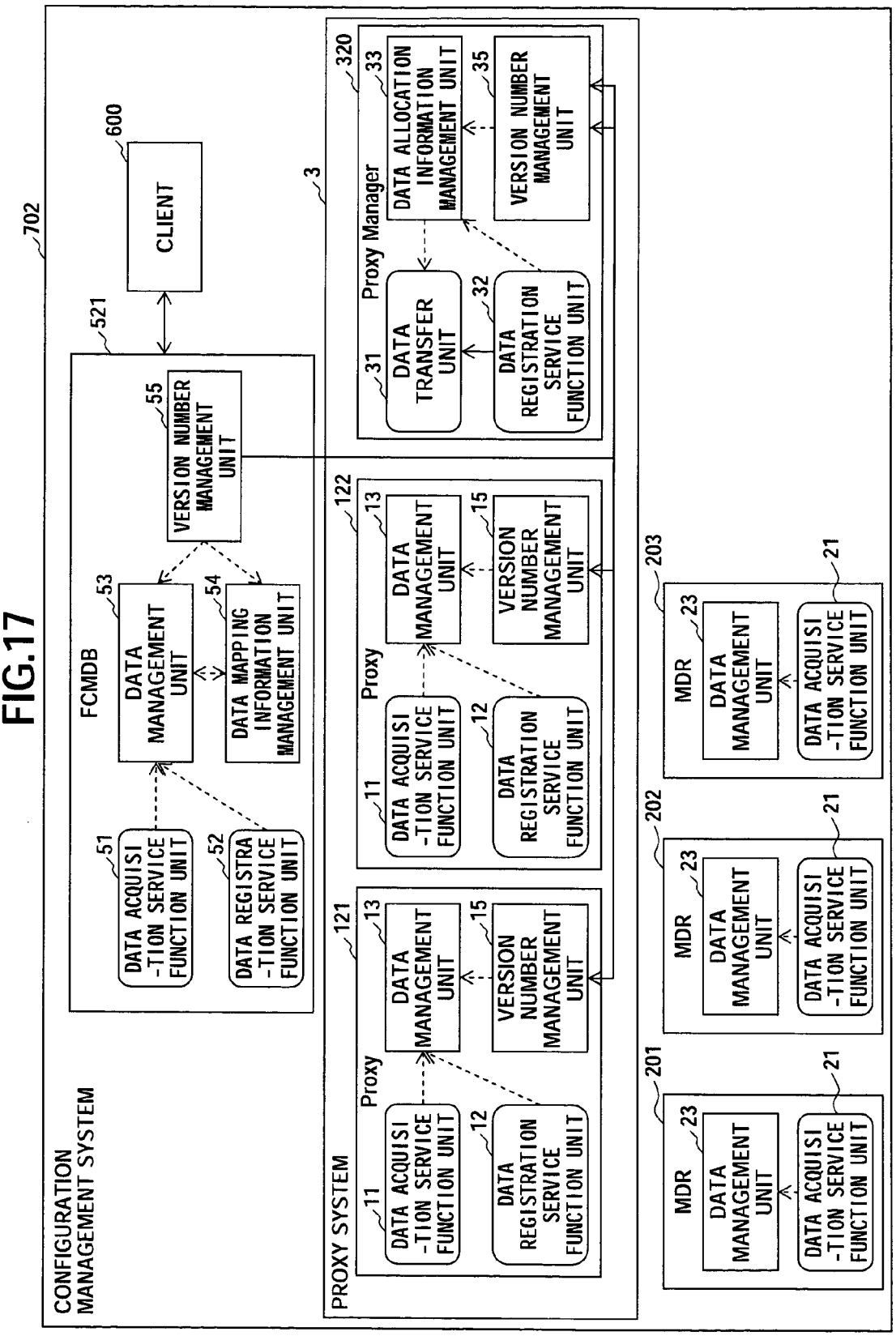
FIG. 17 is a drawing illustrating an example of the functional configuration of a configuration management system according to the third embodiment.

FIG. 17 is a block diagram illustrating a configuration management system of the third embodiment. A configuration management system 702 includes a FCMDB 521 and a proxy system 3. The FCMDB 521 includes a version number management unit 55.

The version number management unit 55 issues a request to start version-number processing to each function unit of the FCMDB 521 and to the proxy system 3. The version number management unit 55 notifies the client 600 of an end of processing when the version-number processing comes to an end.

The proxy system 3 of the configuration management system 702 includes proxy apparatuses 121 and 122 and a proxy management apparatus 320. The proxy management apparatus 320 includes a version number management unit 35, which receives version-number data (data indicative of an adopted number) from the FCMDB 521, and causes the data allocation information management unit 33 of the proxy management apparatus 320 to store a differential between the current data and the data of a preceding version number. Each of the proxy apparatuses 121 and 122 includes a version number management unit 15, which receives version-number data from the FCMDB 521, and causes the data management unit 13 of the proxy apparatuses 121 and 122 to store a differential between the current data and the data of a preceding version number.

In addition to what is described above, the function units of the proxy apparatuses 121 and 122, the proxy management apparatus 320, and the FCMDB 521 in the third embodiment perform additional processes for performing version-number management.

The additional processes will be described with reference the following flowcharts.

Figure 18:
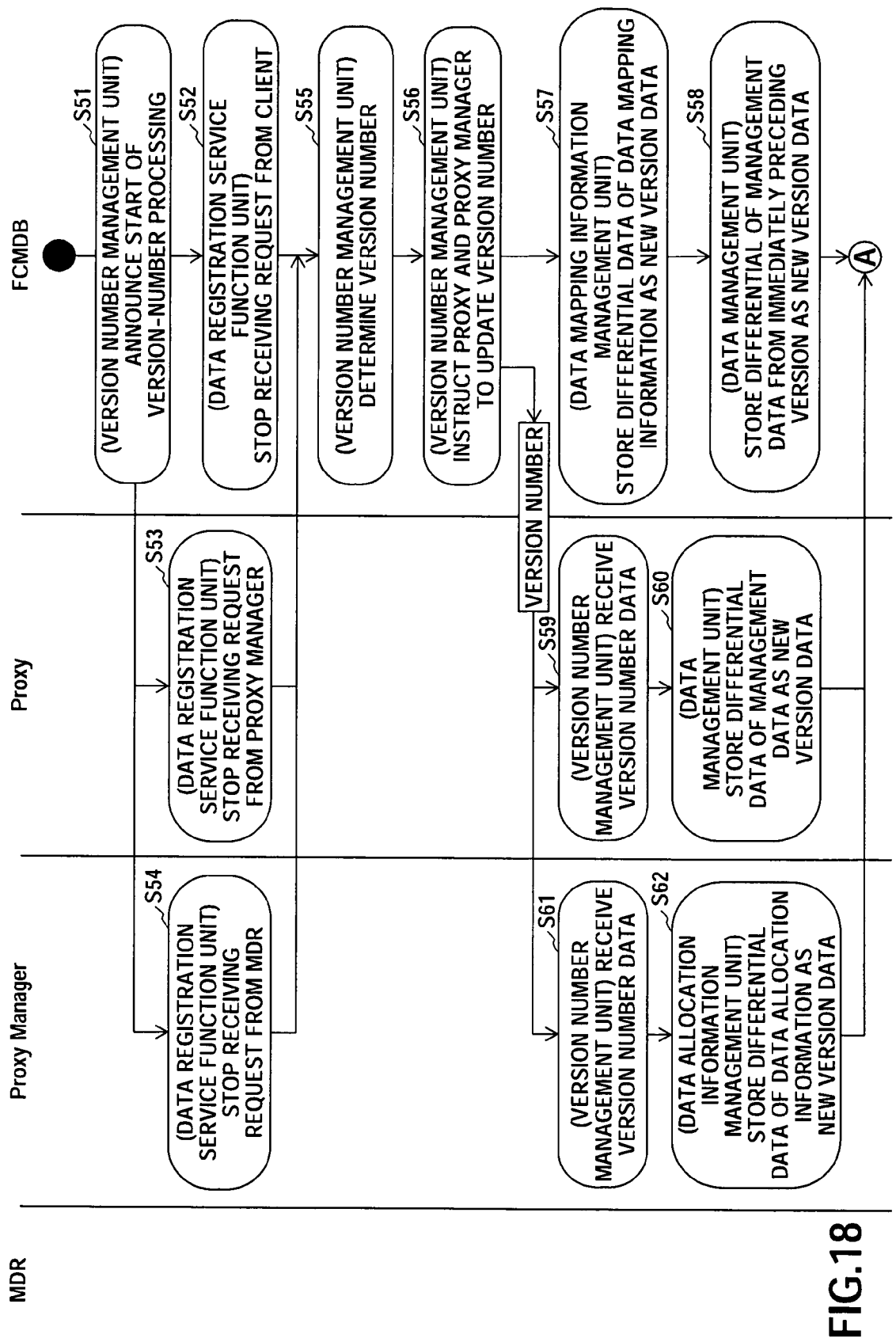
FIG. 18 is a drawing illustrating an example of an operation performed by the configuration management system according to the third embodiment.
Figure 19:
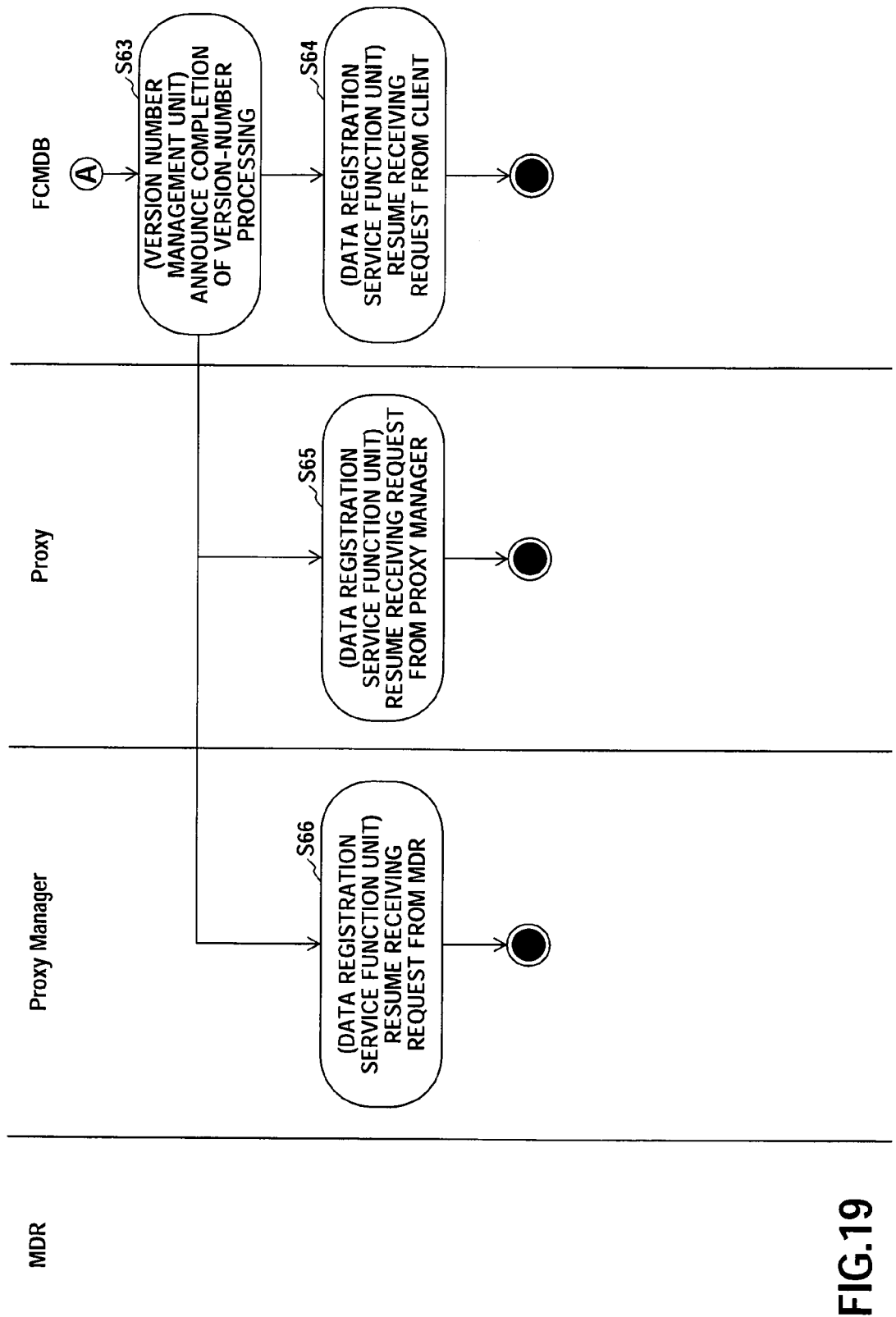
FIG. 19 is a drawing illustrating an example of an operation performed by the configuration management system according to the third embodiment.
Figure 20:
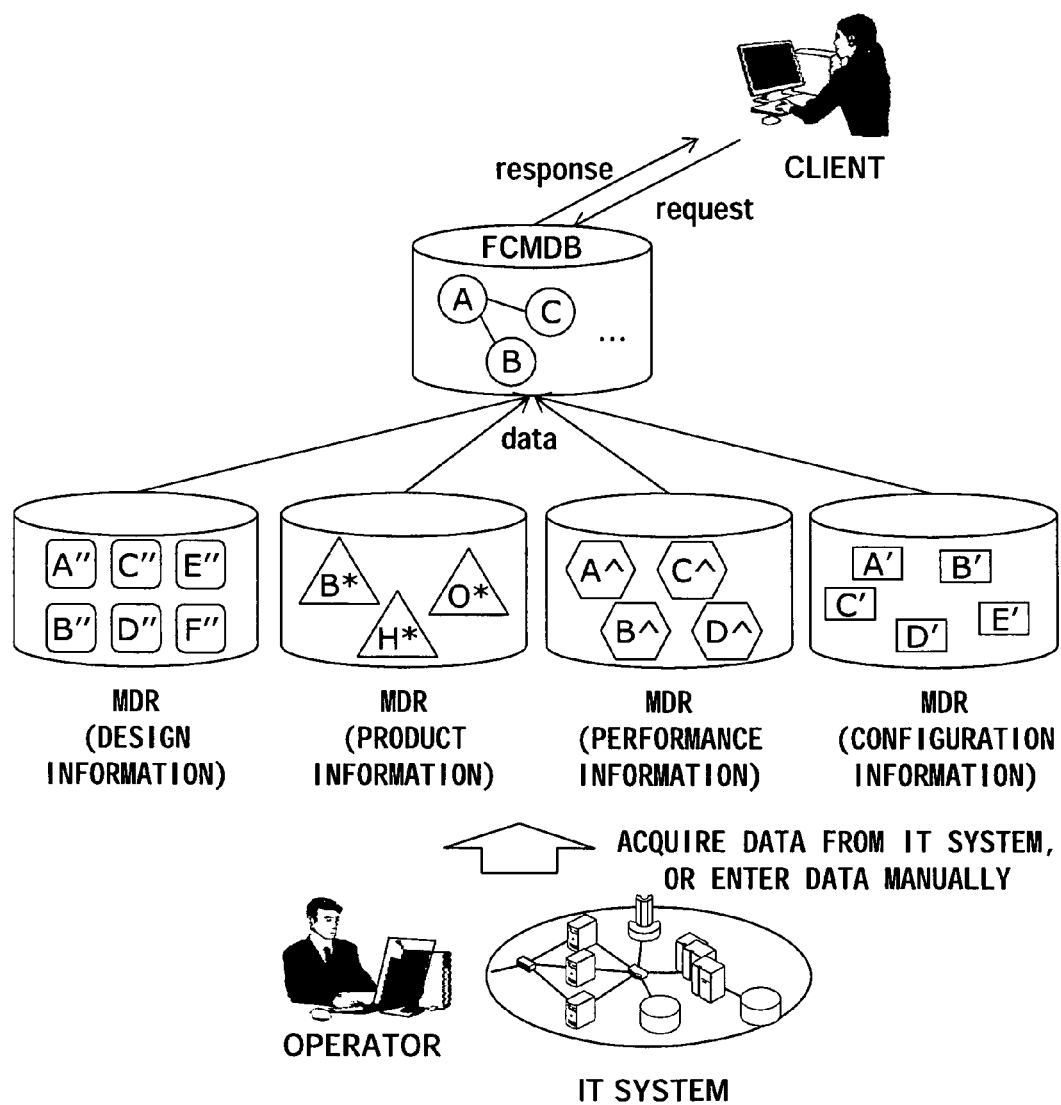
FIG. 20 is a drawing illustrating an outline of the configuration of a related-art configuration management system.
Figure 21:
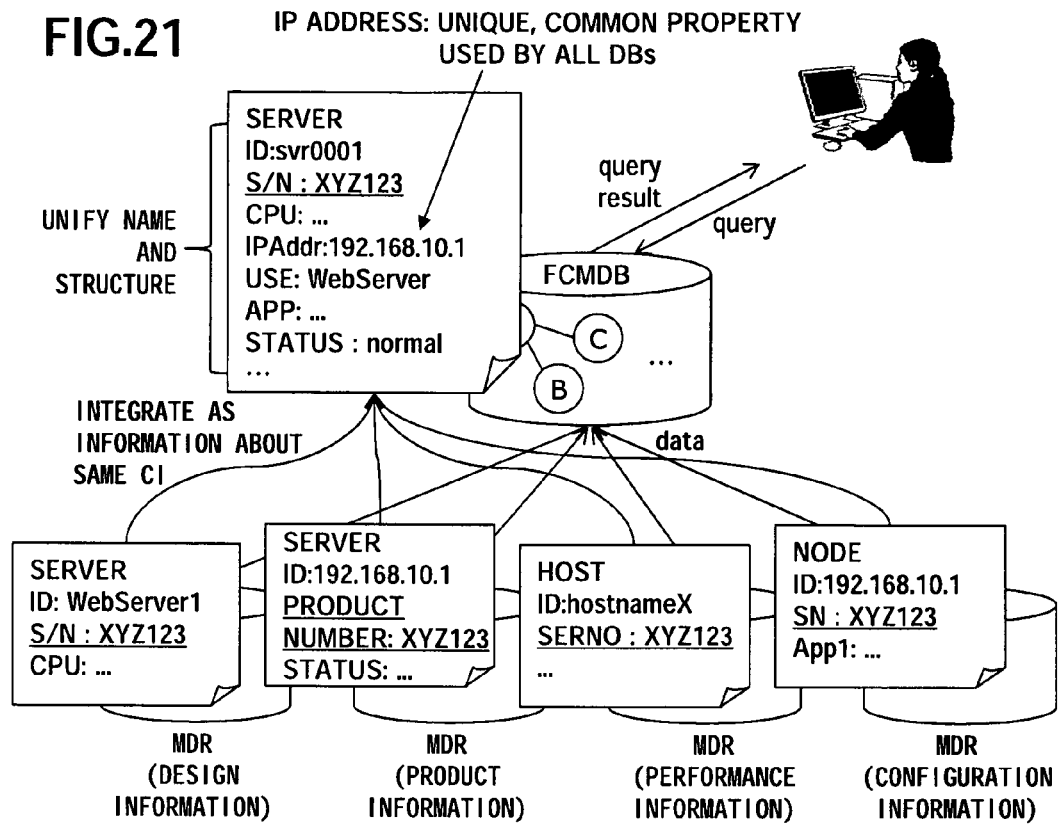
FIG. 21 is a drawing for illustrating the reconcile and integrate processes of the configuration management system.
Figure 22:
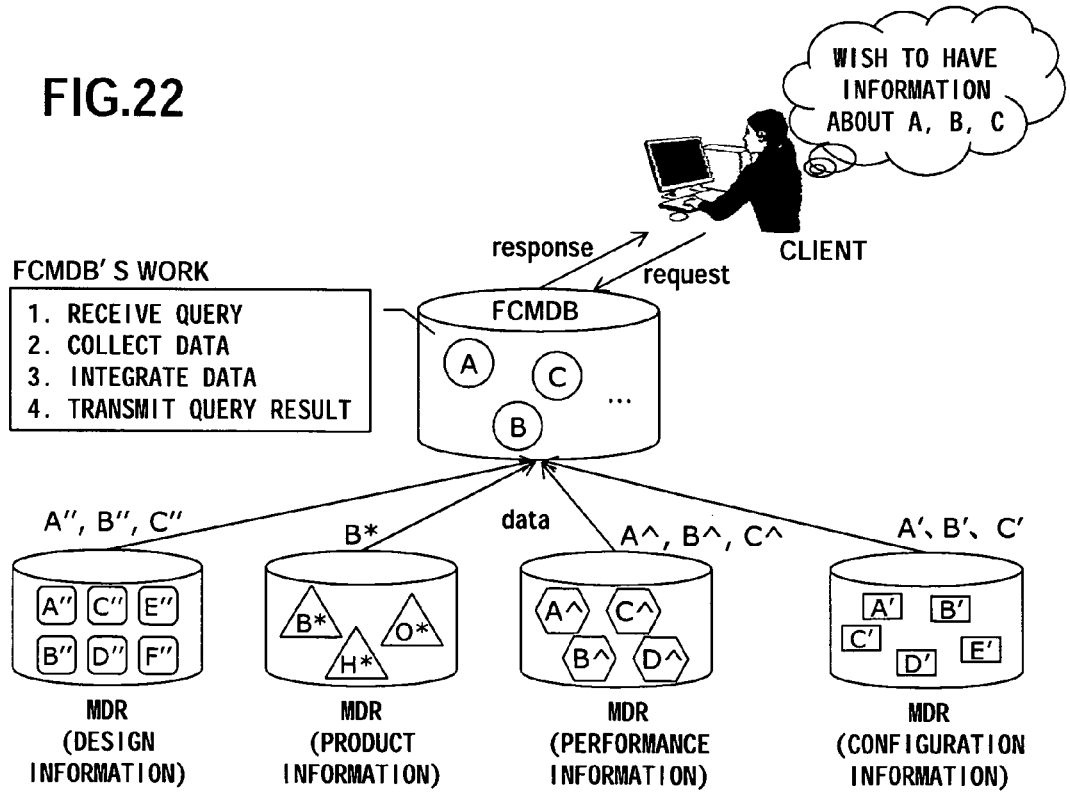
FIG. 22 is a drawing illustrating an operation performed by the configuration management system upon a request from a client.
Figure 23:
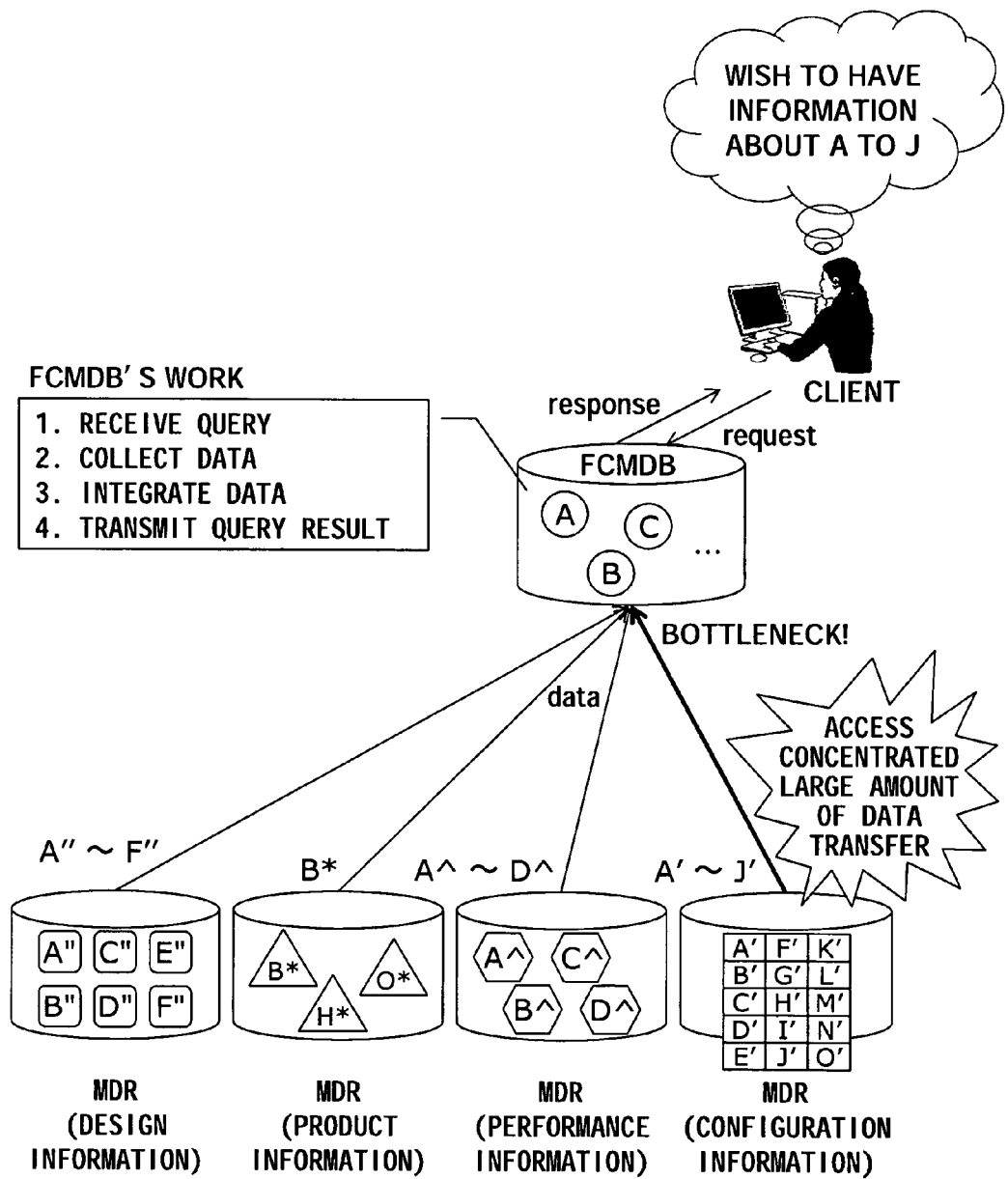
FIG. 23 is a drawing illustrating a problem of the related-art configuration management system.

A description will be given of the operation of the configuration management system 702 according to the third embodiment by referring to the flowcharts of FIG. 18 and FIG. 19.

Upon receiving an instruction to start version-number processing from the client 600, for example, the FCMDB 521 sends a notice indicative of the start of version-number processing to the proxy apparatuses 121 and 122 and the proxy management apparatus 320 (S51). Further, the FCMDB 521 stops receiving a request from the client 600 (S52).

Upon receiving the notice, the proxy management apparatus 320 stops receiving a request from the MDRs, and sends a notice of stoppage completion to the FCMDB 521 (S54). Further, the proxy apparatuses 121 and 122 stop receiving a request from the proxy management apparatus 320, and sends a notice of stoppage completion to the FCMDB 521 (S53).

Upon receiving the notice of stoppage completion, the FCMDB 521 adopts a version number (S55). The FCMDB 521 then notifies the proxy apparatuses 121 and 122 and the proxy management apparatus 320 of the adopted version-number data thereby to request version-number updating (S56). After this, the FCMDB 521 stores (S57) differential data (which refers to, and will hereinafter refer to, differential data between the current data and the immediately preceding version-number data) of data mapping information (i.e., data illustrated in FIG. 6-(C)). Further, the FCMDB 521 stores (S58) differential data of the management data (i.e., data illustrated in FIG. 6-(B)).

The proxy management apparatus 320 receives the version-number data (S61). The proxy management apparatus 320 stores differential data of the data allocation information (i.e., data illustrated in FIG. 6-(A)), followed by sending a notice of completion to the FCMDB 521 upon completing the storing (S62). The proxy apparatuses 121 and 122 receive the version-number data (S59). The proxy apparatuses 121 and 122 store differential data of the management data (i.e., data illustrated in FIG. 7), followed by sending a notice of completion to the FCMDB 521 upon completing the storing (S60).

The data stored by the processes performed in S57, S58, S60, and S62 are provided with the version number adopted in step S55.

After the completion of the processes of S57, S58, S60, and S62, the FCMDB 521 notifies the proxy apparatuses 121 and 122 and the proxy management apparatus 320 of the completion of version-number processing (S63). Thereafter, the FCMDB 521 starts receiving a request from the client 600 (S64).

Upon being notified of the completion of version-number processing, the proxy apparatuses 121 and 122 resume receiving a request from the proxy management apparatus 320 (S65). Further, the proxy management apparatus 320 resumes receiving a request from the MDR (S66).

The configuration management systems of the above-described embodiments may provide the following advantages.

The configuration management systems of the above-described embodiments may be provided with a proxy system that makes use of CMDB features, thereby evenly distributing data. The configuration management systems of the above-described embodiments may distribute accesses.

The configuration management systems of the above-described embodiments may consolidate (i.e., reconcile and integrate) the same CI data in advance, thereby making data acquisition more efficient.

As in the configuration management systems of the above-described embodiments, the proxy system may be provided with a dynamic load distribution function, thereby dynamically redistributing data between proxy apparatuses in response to usage conditions.

When the configuration management system is provided with the version-number management function, the version-number processing is evenly spread because the data are evenly distributed, thereby increasing the speed of version-number-updating processing as a whole.

[Industrial Applicability]

A proxy system serving as a proxy layer is provided in a configuration management system to evenly distribute data, thereby distributing loads to increase processing speed.

The invention claimed is:

1. A configuration management system comprising:
a plurality of databases that stores information about resources as configuration items;
a configuration management computer;
a plurality of proxy computers; and
a proxy management computer, the proxy management computer comprising:
a receiving unit that receives configuration items from the plurality of databases;
a reconciling unit that reconciles the received configuration items; and
a sending unit that sends and distributes the reconciled configuration items to the plurality of proxy computers such that processing by the plurality of proxy computers is evenly distributed over the proxy computers,
wherein each of the plurality of proxy computers stores configuration items sent from the proxy management computer,
wherein the configuration management computer receives a query from a client, selects, from the plurality of proxy computers, a proxy computer that stores a configuration item that is to serve as a query result, and receives the configuration item from the selected proxy computer,
wherein the proxy management computer receives load information of each of the configuration items from the plurality of proxy computers,
wherein the proxy management computer further comprises a distribution management unit that instructs, upon detection of an excessive access to a first configuration item that is stored in a first proxy computer based on the received load information, the first proxy computer to move a second configuration item to a second proxy computer, the second configuration item being stored in the first proxy computer and being different from the first configuration item, and
wherein the excessive access is determined as when the first proxy computer performance is expected to be lowered.

2. The configuration management system as claimed in claim 1, wherein the proxy management computer sends and distributes the reconciled configuration items to the proxy computers such that numbers of configuration items stored in the plurality of proxy computers are substantially equal to each other, thereby sending and distributing the reconciled configuration items to the proxy computers such that processing by the plurality of proxy computers is evenly distributed over the proxy computers.

3. The configuration management system as claimed in claim 1, wherein the proxy management computer, based on the received load information, sends the plurality of proxy computers an instruction to move configuration items that are stored in the plurality of proxy computers such that loads are evenly distributed over the plurality of proxy computers,
and wherein the plurality of proxy computers exchange stored configuration items with each other based on the instruction to move.

4. The configuration management system as claimed in claim 1, wherein the configuration management computer determines a version number of a backup to send information indicative of the version number to the proxy management computer and the plurality of proxy computers, and uses the version number to back up data about the plurality of proxy computers that are locally stored,
wherein the proxy management computer uses the version number to back up data about the plurality of proxy computers that are locally stored,
and wherein the plurality of proxy computers use the version number to back up the configuration items that are locally stored.

5. A proxy management computer comprising:
a receiving unit that receives configuration items from a plurality of databases that store information about resources as configuration items;
a reconciling unit that reconciles the received configuration items; and
a sending unit that sends and distributes the reconciled configuration items to a plurality of proxy computers such that processing by the plurality of proxy computers is evenly distributed over the proxy computers,
wherein the proxy management computer receives load information of each of the configuration items from the plurality of proxy computers,
wherein the proxy management computer further comprises a distribution management unit that instructs, upon detection of an excessive access to a first configuration item that is stored in a first proxy computer based on the received load information, the first proxy computer to move a second configuration item to a second proxy computer, the second configuration item being stored in the first proxy computer and being different from the first configuration item, and
wherein the excessive access is determined as when the first proxy computer performance is expected to be lowered.

6. The proxy management computer as claimed in claim 5, wherein the sending unit sends and distributes the reconciled configuration items to the proxy computers such that numbers of configuration items stored in the plurality of proxy computers are substantially equal to each other, thereby sending and distributing the reconciled configuration items to the proxy computers such that processing by the plurality of proxy computers is evenly distributed over the proxy computers.

7. The proxy management computer as claimed in claim 5, wherein the distribution management unit, based on the received load information, sends the plurality of proxy computers an instruction to move configuration items that are stored in the plurality of proxy computers such that loads are evenly distributed over the plurality of proxy computers.

8. The proxy management computer as claimed in claim 5, wherein the proxy management computer uses a version number sent from the configuration management computer to back up data about the plurality of proxy computers that are locally stored.

9. A configuration management method comprising:
receiving configuration items from a plurality of databases that store information about resources as configuration items;
reconciling the received configuration items;
sending and distributing the reconciled configuration items to proxy apparatuses such that processing by the proxy apparatuses is evenly distributed over the proxy apparatuses;
storing in the proxy apparatuses the configuration items that are sent;
receiving a query from a client, selecting among the plurality of proxy apparatuses a proxy apparatus that stores a configuration item that is to serve as a query result, and receiving the configuration item from the selected proxy apparatus;

receiving load information of each of the configuration items from the plurality of proxy apparatuses; and instructing, upon detection of an excessive access to a first configuration item that is stored in a first proxy apparatus based on the received load information, the first proxy apparatus to move a second configuration item to a second proxy apparatus, the second configuration item being stored in the first proxy apparatus and being different from the first configuration item, and wherein the excessive access is determined as when the first proxy apparatus performance is expected to be lowered.

10. The configuration management method as claimed in claim 9, wherein the sending and distributing sends and distributes the reconciled configuration items to the proxy apparatuses such that numbers of configuration items stored in the plurality of proxy apparatuses are substantially equal to each other, thereby sending and distributing the reconciled configuration items to the proxy apparatuses such that processing by the plurality of proxy apparatuses is evenly distributed over the proxy apparatuses.

11. The configuration management method as claimed in claim 9, further performing:

sending, to the plurality of proxy apparatuses based on the received load information, an instruction to move configuration items that are stored in the plurality of proxy apparatuses such that loads are evenly distributed over the plurality of proxy apparatuses; and exchanging configuration items stored in the plurality of proxy apparatuses between the plurality of proxy apparatuses based on the instruction to move.

12. The configuration management method as claimed in claim 9, further performing:

determining a version number for a backup; and backing up data about the plurality of proxy apparatuses by use of the version number, and backing up configuration items stored in the plurality of proxy apparatuses by use of the version number.

* * * * *